(12) United States Patent
Lagziel et al.

(10) Patent No.: US 10,131,505 B2
(45) Date of Patent: Nov. 20, 2018

(54) BAGGAGE HANDLING SYSTEM

(71) Applicant: ISRAEL AEROSPACE INDUSTRIES LTD., Lod (IL)

(72) Inventors: Rafi Lagziel, Modi'in (IL); Itzhak Kiselevich, Rishon LeZion (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 15/567,482

(22) PCT Filed: Apr. 19, 2016

(86) PCT No.: PCT/IL2016/050404
§ 371 (c)(1),
(2) Date: Oct. 18, 2017

(87) PCT Pub. No.: WO2016/170528
PCT Pub. Date: Oct. 27, 2016

(65) Prior Publication Data
US 2018/0118472 A1    May 3, 2018

(30) Foreign Application Priority Data
Apr. 22, 2015  (IL) .......................................... 238444

(51) Int. Cl.
*B65G 47/54* (2006.01)
*B65G 47/94* (2006.01)
(Continued)

(52) U.S. Cl.
CPC ............ *B65G 47/642* (2013.01); *B64F 1/368* (2013.01); *B65G 47/49* (2013.01); *B65G 47/54* (2013.01);
(Continued)

(58) Field of Classification Search
CPC ...... B65G 47/642; B65G 47/902; B64F 1/368
(Continued)

(56) References Cited

U.S. PATENT DOCUMENTS 3,424,324 A    1/1969  Weir
3,718,249 A *  2/1973  Hess .................... B65G 17/066
                                              198/822

(Continued)

FOREIGN PATENT DOCUMENTS

DE    29519805 U1    1/1996
EP      0556037        8/1993
(Continued)

OTHER PUBLICATIONS

International Search Report and Written Opinon for International Application No. PCT/IL2016/050404 dated Aug. 8, 2016.

*Primary Examiner* — Douglas A Hess
(74) *Attorney, Agent, or Firm* — Dorsey & Whitney LLP

(57) ABSTRACT

A baggage transfer conveyer unit for mounting over a baggage carousel having a carousel transferring path for transferring a baggage therealong is provided. The conveyor unit comprises a proximal end, a distal end, an upper surface by means of which the baggage is to be transferred from the proximal end to the distal end along a conveyor unit transferring path extending between the ends, a baggage transferring mechanism configured for causing the upper surface to transfer the baggage along the conveyor transferring path; and a baggage diverting mechanism configured for causing a part of the upper surface to divert the baggage from the conveyer unit transferring path along a diverted direction different from that of the conveyor unit transferring path. The baggage transfer conveyer unit is configured to be (Continued)

mounted over the baggage carousel such that the conveyer transferring path is aligned with the carousel transferring path.

22 Claims, 24 Drawing Sheets

(51) Int. Cl.
  *B65G 47/64* (2006.01)
  *B65G 47/49* (2006.01)
  *B64F 1/36* (2017.01)
  *B65G 47/90* (2006.01)
  *B65G 65/23* (2006.01)

(52) U.S. Cl.
  CPC ........... *B65G 47/902* (2013.01); *B65G 47/94* (2013.01); *B65G 65/23* (2013.01); *B65G 2201/0264* (2013.01)

(58) Field of Classification Search
  USPC ........ 198/370.07, 370.1, 375, 456, 779, 822
  See application file for complete search history.

(56) References Cited

U.S. PATENT DOCUMENTS

| | | | |
|---|---|---|---|
| 4,802,810 A | 2/1989 | Gunn | |
| 5,117,961 A | 6/1992 | Nicholson | |
| 5,154,273 A * | 10/1992 | Macomber | B65G 17/066 198/321 |
| 5,311,981 A | 5/1994 | Crandall et al. | |
| 5,547,084 A * | 8/1996 | Okada | B65G 17/345 198/370.06 |
| 6,076,683 A | 6/2000 | Okada et al. | |
| 6,315,101 B1 * | 11/2001 | Hugon | B65G 17/38 198/370.07 |
| 6,397,999 B1 * | 6/2002 | Taylor | B65G 13/12 186/2 |
| 6,698,577 B1 | 3/2004 | Conklin et al. | |
| 7,007,792 B1 * | 3/2006 | Burch | B65G 17/24 198/370.03 |
| 7,213,699 B2 * | 5/2007 | Adams | B65G 29/00 198/608 |
| 7,284,653 B2 | 10/2007 | Fourney et al. | |
| 7,621,392 B2 * | 11/2009 | Langsdorf | B65G 17/066 198/502.1 |
| 7,798,311 B2 * | 9/2010 | Grant | B65G 17/08 198/502.1 |
| 8,509,945 B1 * | 8/2013 | Snaith | B64F 1/368 198/349 |
| 8,717,165 B2 * | 5/2014 | Gernandt | G06K 19/0705 340/539.13 |
| 8,727,103 B2 | 5/2014 | Vitalini | |
| 8,742,922 B2 * | 6/2014 | Ferrari | G06Q 10/08 340/539.11 |
| 9,233,805 B2 * | 1/2016 | Nyquist | B65G 65/00 |
| 9,412,140 B2 * | 8/2016 | Molloy | G06Q 10/10 |
| 2005/0040016 A1 | 2/2005 | Tasma et al. | |
| 2006/0070857 A1 | 4/2006 | Fourney | |
| 2009/0145723 A1 | 6/2009 | Ogawa | |
| 2009/0200139 A1 | 8/2009 | Kissee et al. | |
| 2011/0088996 A1 | 4/2011 | Hoene | |

FOREIGN PATENT DOCUMENTS

| | | |
|---|---|---|
| EP | 1655251 | 5/2006 |
| FR | 2742427 A1 | 6/1997 |

* cited by examiner

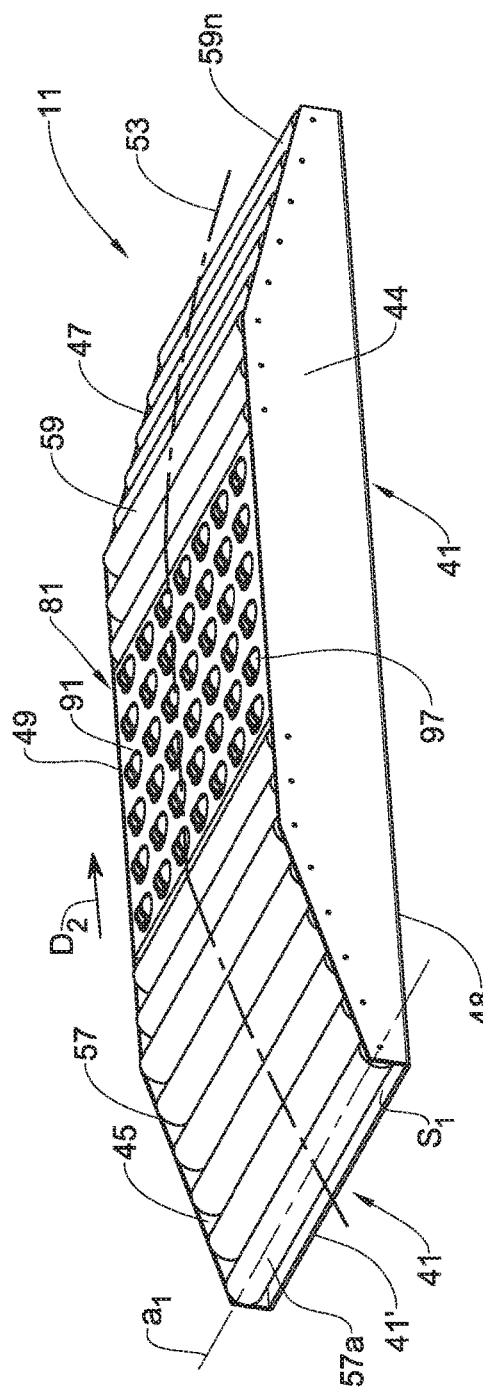

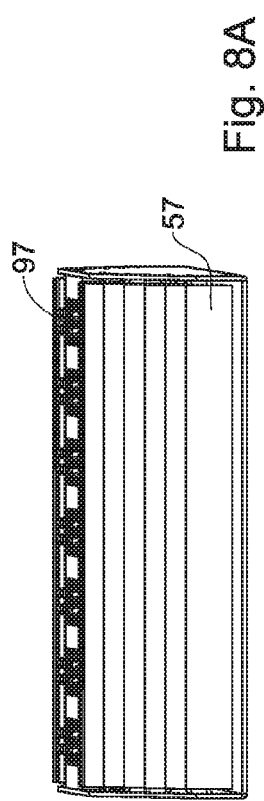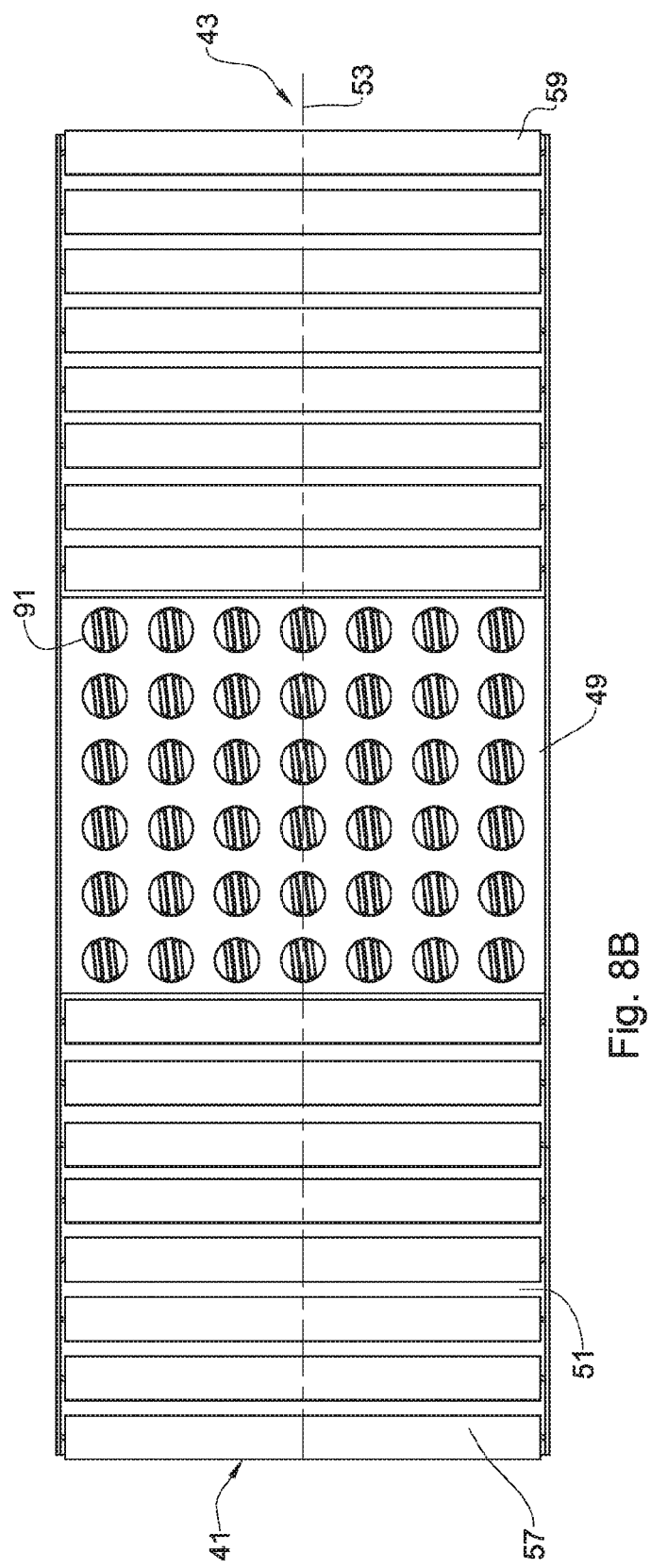

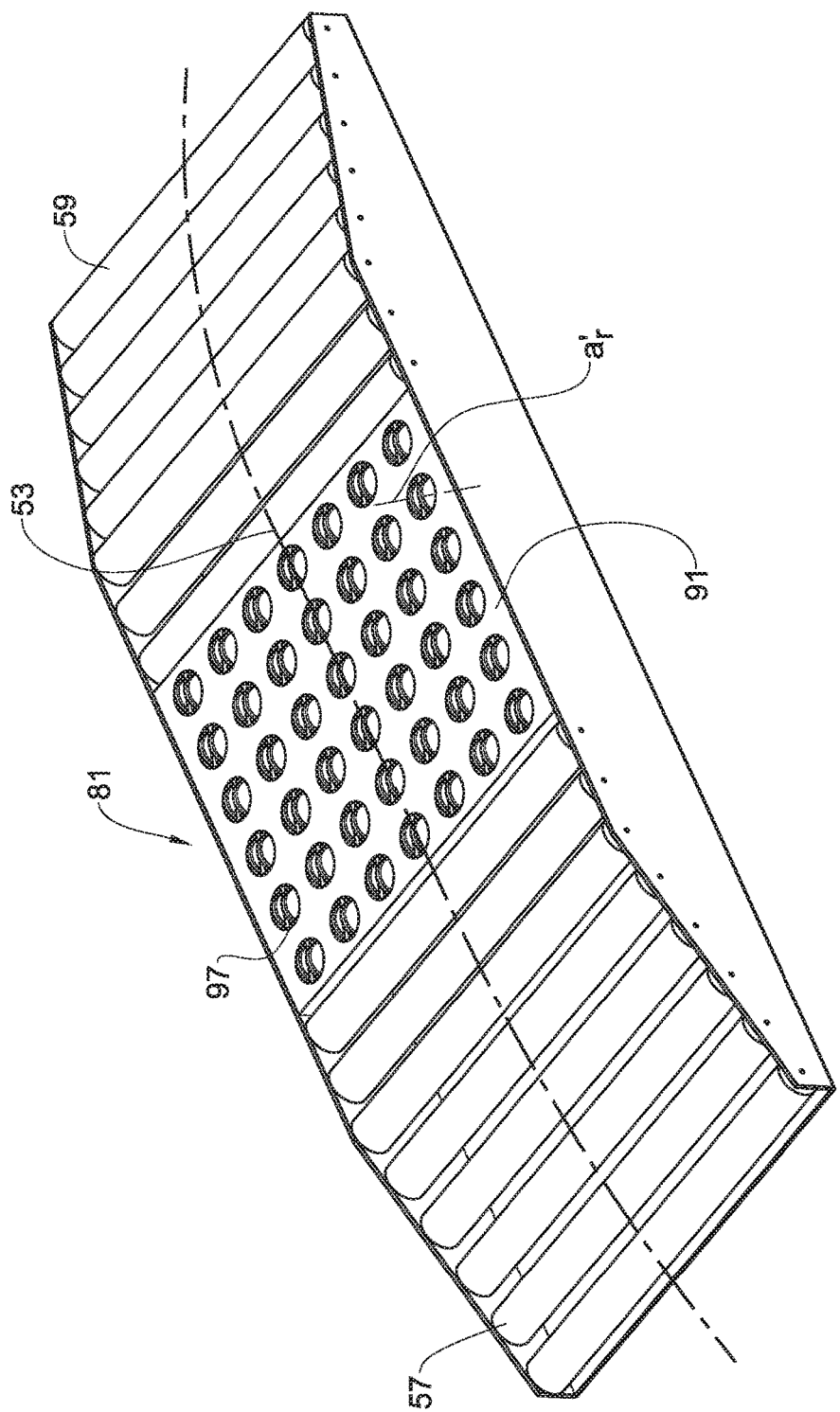

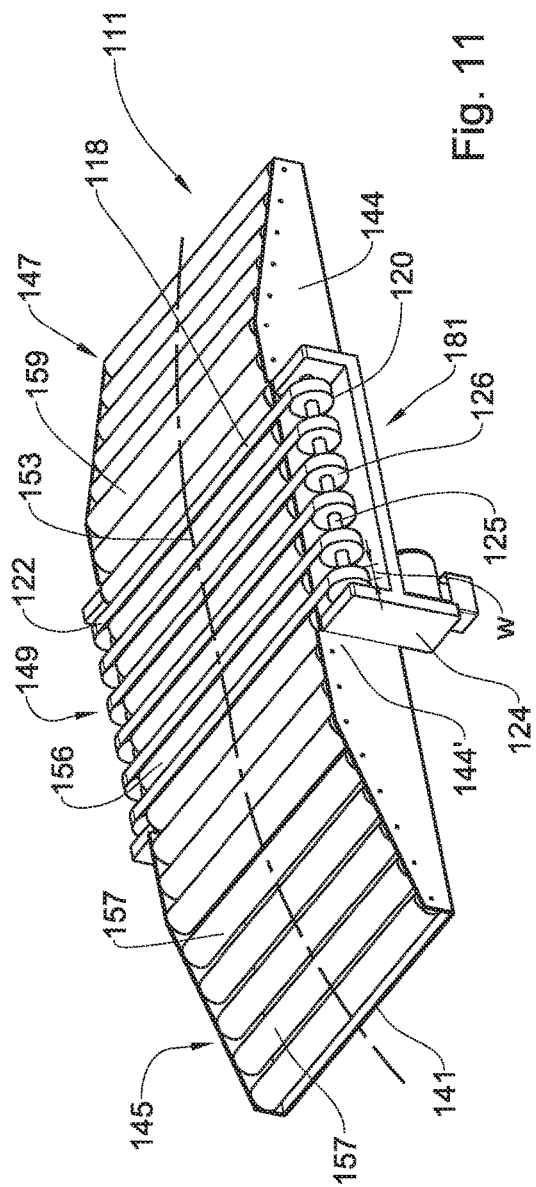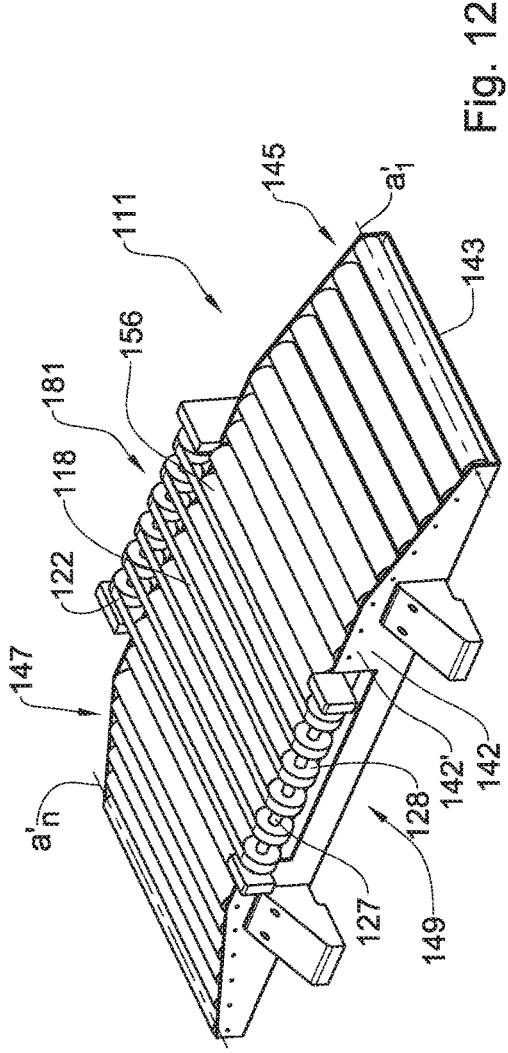

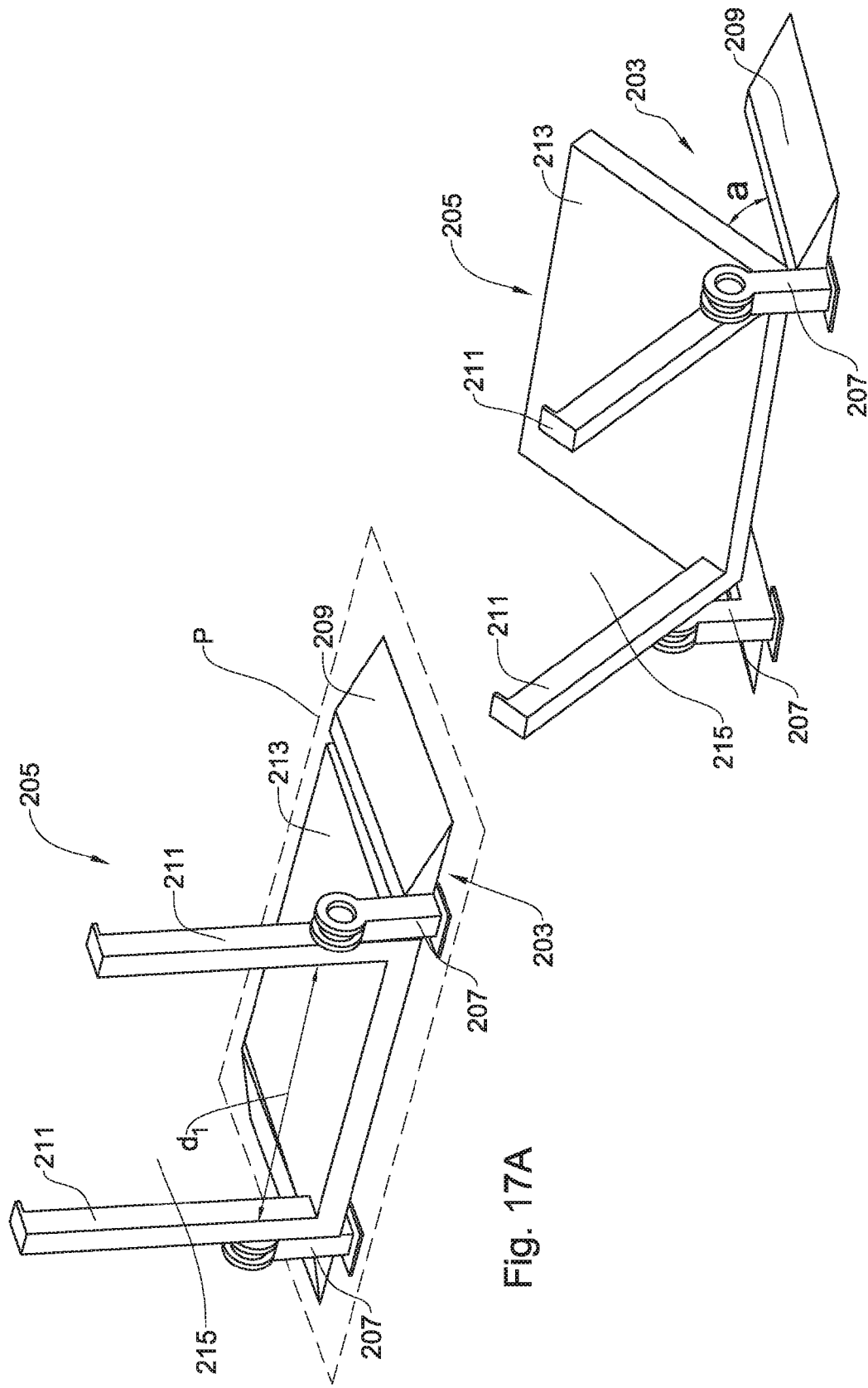

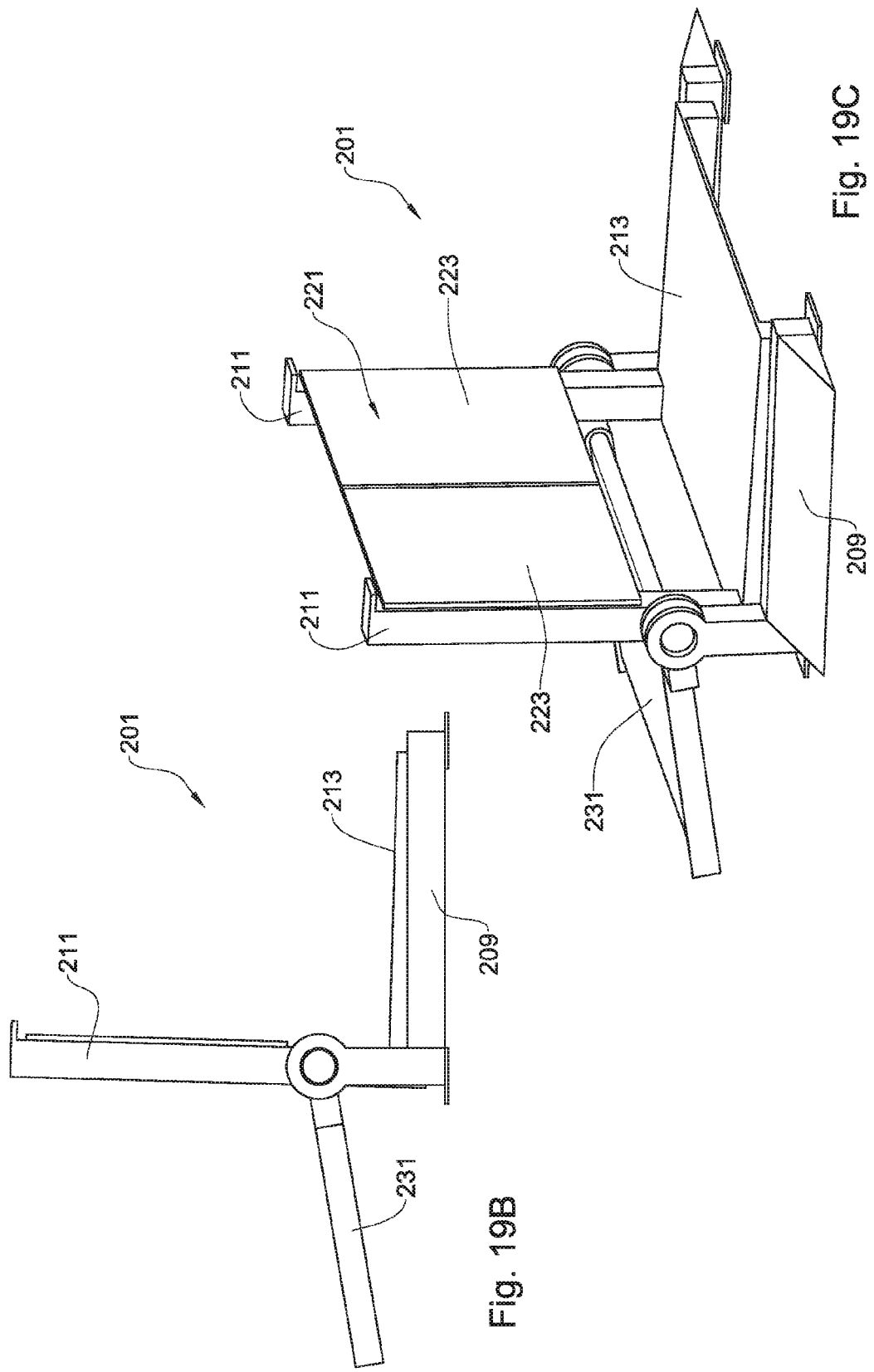

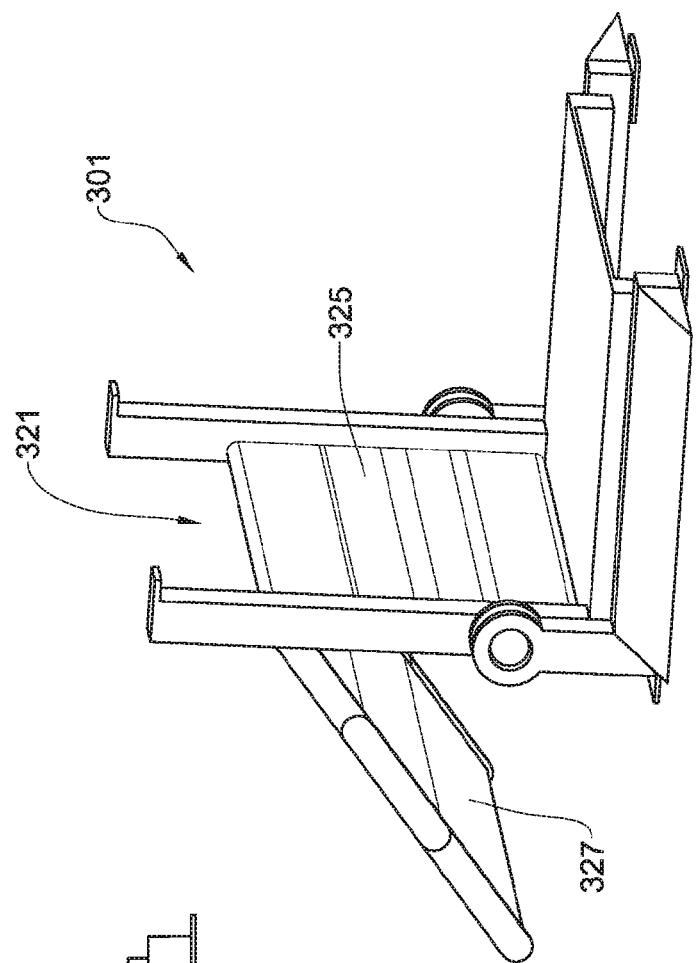
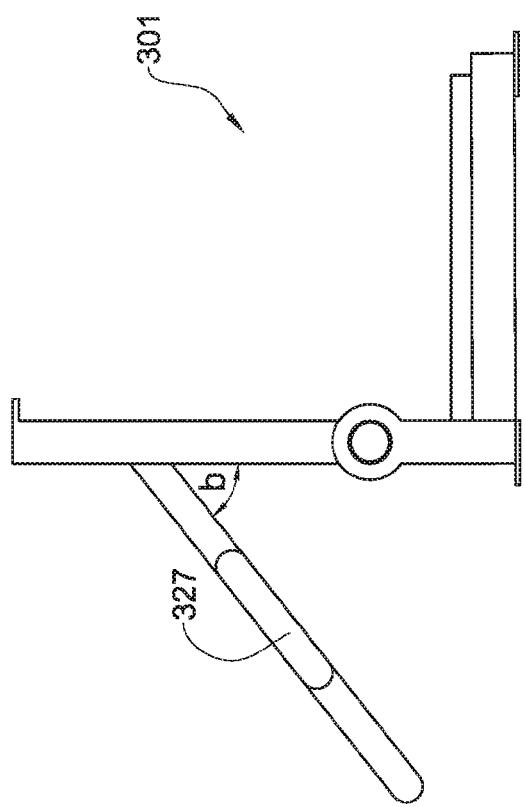

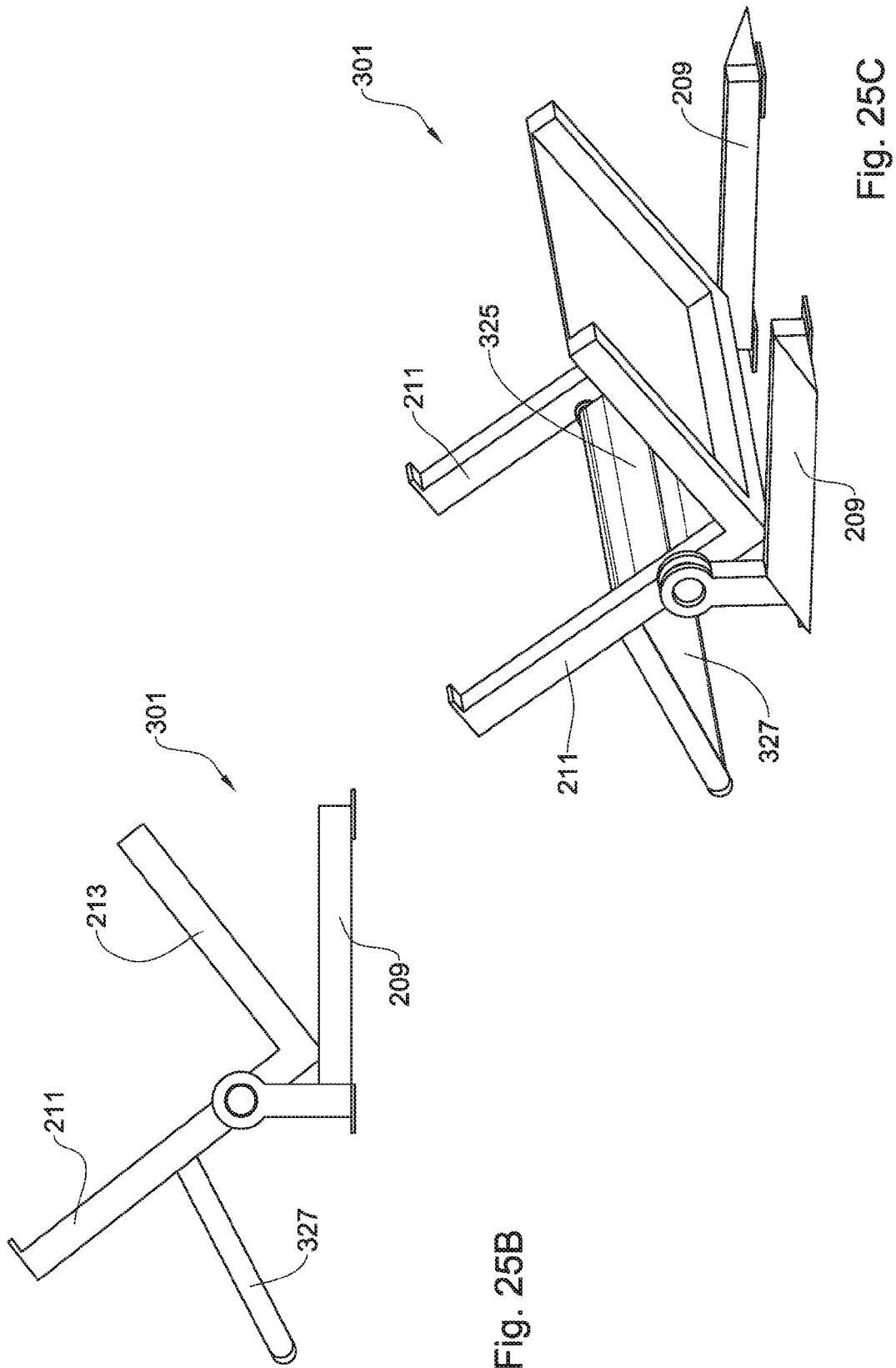

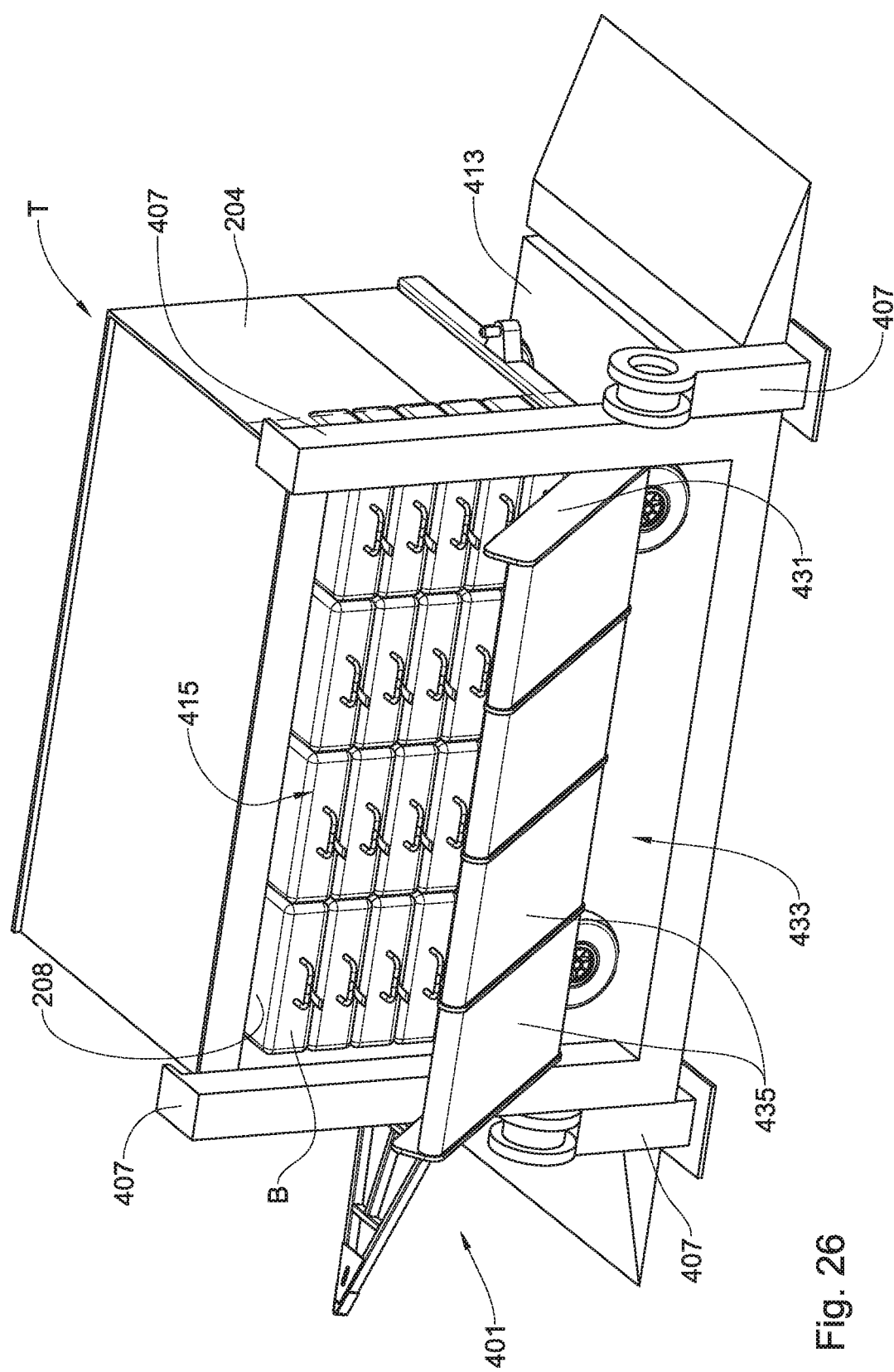

BAGGAGE HANDLING SYSTEM

TECHNOLOGICAL FIELD

The presently disclosed subject matter refers to a baggage handling systems, and in particularly automatic baggage sorting and unloading systems.

BACKGROUND

Automatic baggage handling systems are generally known in the art and are usually used in airports to handle departure baggage from check-in to departure gate, as well as arrival baggage.

Some examples of such systems are described in U.S. Pat. No. 8,727,103, U.S. Pat. No. 7,284,653, U.S. Pat. No. 6,076,683 and EP 0 556 037.

SUMMARY

In accordance with one aspect of the presently disclosed subject matter there is provided a baggage transfer conveyer unit for use with a baggage carousel having a carousel transferring path for transferring a baggage therealong, the baggage transfer conveyor unit configured for being mounted over the baggage carousel and comprising:
- a proximal end, a distal end, an upper surface by means of which the baggage is to be transferred from the proximal end to the distal end along a conveyor unit transferring path extending between the ends;
- a baggage transferring mechanism configured for causing the upper surface to transfer the baggage along the conveyor transferring path; and
- a baggage diverting mechanism configured for causing a part of the upper surface to divert the baggage from the conveyer unit transferring path along a diverted direction different from that of the conveyor unit transferring path;

wherein the baggage transfer conveyer unit is configured to be mounted over the baggage carousel such that the conveyer transferring path is aligned with the carousel transferring path.

The conveyor unit transferring path may be configured for forming a continuous baggage transferring path with the carousel transferring path when the conveyor unit is mounted over the carousel and when the baggage diverting mechanism is not in operation.

The upper surface of the conveyer unit may comprise a top surface portion, a proximal surface portion extending between the proximal end of the conveyer unit and the top surface portion, and a distal surface portion extending between the top surface portion and the distal end of the conveyer unit and, optionally, wherein the upper surface may have a convexly curved shape such that the proximal surface portion extends upwardly from the proximal end to the top surface portion and the distal surface portion extends downwardly from the top portion to the distal end.

The baggage transfer conveyer unit may further comprise:
- a lower surface extending between the proximal and distal ends of the conveyer unit so as to face the baggage carousel when the baggage transfer conveyer unit is mounted over the baggage carousel,
- two sides extending between the upper and lower surfaces and defining therewithin a body of the conveyer unit.

The body, when seen in the side view, may have a substantially trapezoid shape.

The baggage carousel may comprise a moveable carousel belt and the baggage transfer conveyer unit may be configured to be mounted over the belt slightly spaced upwardly therefrom, such that:
- continuous baggage flow is maintained along the carousel transferring path and the conveyer unit transferring path; and
- movement of the carousel belt under the conveyer unit is allowed.

The baggage transfer conveyer unit may further comprise a mounting arrangement for mounting thereover the baggage carousel.

The diverting mechanism may be configured for changing the direction of the baggage with respect to the conveyer transferring path.

The diverting mechanism may be configured for moving the baggage along the diverted direction.

The diverted direction may form an angle with the conveyer transferring path.

The baggage transfer conveyer unit may further comprise a diverting surface from which the baggage is diverted by means of the diverting mechanism.

The diverting mechanism may have a diverting mode of operation and a transferring mode of operation, such that in the transferring mode the diverting mechanism together with the transferring mechanism cause the upper surface of the conveyer unit to transfer the baggage along the conveyor unit transferring path from the proximal end of the unit to the distal end of the unit, and in the diverting mode the diverting mechanism causes a part of the upper surface of the conveyer unit to divert the baggage along the diverted direction.

The part of the upper surface of the conveyer unit may be constituted by a plurality of rollers each having a roller axis and being configured for rotating about the axis, the rollers being arranged such that their axes are parallel and such that they are all rotatable in the same direction.

The diverting mechanism may be configured for pivoting the rollers between a position in which their axes are perpendicular to the conveyor transferring path when the diverting mechanism is in the transferring mode and a position, in which their axes are oriented differently than being perpendicular to the conveyor transferring path when the diverting mechanism is in the diverting mode.

The diverting mechanism is configured to have an activated mode in which it causes a part of the upper surface of the conveyer unit to divert the baggage from the conveyor transferring path and an inactivated mode in which the diverting mechanism is not in operation. The baggage transfer conveyer unit may further comprise a belt crank assembly having a plurality of straps constituting the part of the upper surface and oriented such that their longitudinal direction is substantially perpendicular to the conveyor transferring path.

The straps may be configured to pivot about a pivoting axis parallel to, or coaxial with, the conveyor transferring path at least when the diverting mechanism is in its activated mode. The baggage diverting mechanism may further comprise a strap-displacing device configured for displacing the straps at least between an active position corresponding to the active mode of the diverting mechanism, in which the straps are raised with respect to the conveyor transferring path so as to separate the part of the upper surface formed by the straps from the conveyor transferring path, and an inactive position corresponding to the inactive mode of the diverting mechanism, in which the straps are aligned with the conveyor transferring path.

An angle between the diverted direction and the conveyer transferring path if measured from the direction of the distal end of the conveyer unit in the top view of thereof, does not exceed 90 degrees, and optionally may be in the range of 30 to 45 degrees inclusive.

The baggage transfer conveyer unit may further comprise an activation means for activating the diverting mechanism.

The upper surface may comprise one or more moving elements which are movable for advancing the baggage along the conveyor transferring path.

The transferring mechanism may be configured for moving the one or more moving elements in a direction and at speed corresponding to those of the movement of the carousel along the carousel transferring path.

The upper surface of the conveyer unit may comprise a plurality of transferring rollers having parallel axes perpendicular to the conveyor transferring path and rotatable about these axes in the same direction.

The transferring rollers may constitute the proximal and distal surface portions of the conveyer unit and wherein the top portion is free of such transferring rollers.

The proximal and distal surface portions of the upper surface may be each constituted by a transferring belt.

In accordance with another aspect of the presently disclosed subject matter, there is provided a baggage sorting system for sorting a baggage disposed on a baggage carousel having a carousel transferring path for transferring the baggage therealong:
  a baggage identification unit configured for identifying the baggage based on an identifying data thereof;
  at least one baggage transfer conveyor unit as described above; and
  a control unit configured for matching between the baggage and one of the at least one baggage transfer conveyors based on information received from the baggage identification unit and for activating the diverting mechanism of the baggage transfer conveyor when the baggage reaches a predefined position on the one of the at least one baggage transfer conveyors.

In accordance with another aspect of the presently disclosed subject matter, there is provided a baggage unloading device to be used with a baggage storage compartment with a baggage loaded therein, the device comprising:
  a stationary portion;
  a support frame attached to the stationary portion and configured for supporting the baggage storage compartment, defining an opening to the interior of the compartment;
  a lifting mechanism configured for pivoting the support frame with respect to the stationary portion; and
  a gradual release arrangement configured for facilitating gradual release of articles from within the baggage storage compartment The gradual release arrangement may comprise an unloading bridge, the lifting mechanism and unloading bridge being independently pivotable.

The unloading bridge may comprise a conveyer assembly, configured to unload baggage articles therefrom.

The gradual release arrangement may be configured to gradually vary an extent to which the opening is exposed to an exterior so as to allow a gradual gravitational release of the baggage from the baggage compartment through the opening when the support frame together with the storage compartment is lifted by the lifting mechanism into a position pivoted relative to a horizontal plane.

The lifting mechanism may be configured for pivoting the support frame with respect to the stationary frame.

The lifting mechanism may be configured for simultaneously lifting and pivoting the support frame with respect to the stationary frame.

The gradual release arrangement may comprise one or more doors attached to the support frame and configured to be opened so as to gradually expose the opening.

The gradual release arrangement may comprise two doors, rotatingly attached to opposite sides of the support frame, the doors have a closed position in which the doors close the opening and are configured to be gradually opened in a direction corresponding to a direction of flow of the baggage when unloaded through the opening.

The gradual release arrangement may comprise two doors, slidingly attached to opposite sides of the support frame, the doors have a closed position in which the doors close the opening and are configured to be gradually slid in a direction substantially perpendicular to a direction of flow of the baggage when unloaded through the opening.

The gradual release arrangement may comprise a barrier configured to be raised and lowered along an axis substantially perpendicular to a direction of flow of the baggage when unloaded through the opening.

The barrier at its raised position may cover at least a majority of the opening and is configured to be gradually lowered so as to expose the opening and allow the baggage to be released therefrom.

The baggage unloading device according may further comprise an unloading bridge extending from the baggage unloading device and configured for allowing further gradual release of the baggage unloaded from the front opening.

The baggage unloading device according may further comprise an unloading bridge attached to the barrier and configured to be raised and lowered together therewith so as to allow further gradual release of the baggage unloaded from the front opening.

The support frame is a bracket-like member may comprise a base configured for mounting the baggage compartment thereover and a vertical portion substantially perpendicular to the base forming the opening.

At least portions of the gradual release arrangement may be attached to the vertical portion.

The baggage storage compartment may be a part of a trolley.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 6 and 7 show a right and a left perspective view of the baggage transfer conveyor unit of FIGS. 4 and 5;

FIG. 8A shows a front view of the baggage transfer conveyor unit of FIGS. 4 to 7;

FIG. 8B shows a top view of the baggage transfer conveyor unit of FIG. 8A;

FIG. 10 shows a top perspective view of the baggage transfer conveyor unit of FIGS. 6 to 8B in the diverting mode of operation of its movable arrangement;

FIGS. 11 and 12 show a right and a left perspective view of a baggage transfer conveyor unit in accordance with another example of the presently disclosed subject matter, wherein a movable arrangement thereof in its transferring mode of operation;

FIGS. 17A and 17B show front perspective views of a baggage unloading device in first and second positions thereof;

FIG. 19A to 19C show a front perspective view, a side view and back perspective view, respectively, of the baggage unloading device of FIGS. 18A to 18C, shown without the trolley, in a first position thereof;

FIGS. 23A to 23C show a front perspective view, a side view and back perspective view, respectively, of the baggage unloading device of FIG. 22, shown without the trolley, in a first position thereof;

FIG. 25A to 25C show a front perspective view, a side view and back perspective view, respectively, of the baggage unloading device of FIGS. 22 to 24, shown without the trolley, in the second position thereof; and FIG. 26 is a perspective view of another example of a baggage unloading device according to the presently disclosed subject matter.

DETAILED DESCRIPTION OF EMBODIMENTS

Figure 1:
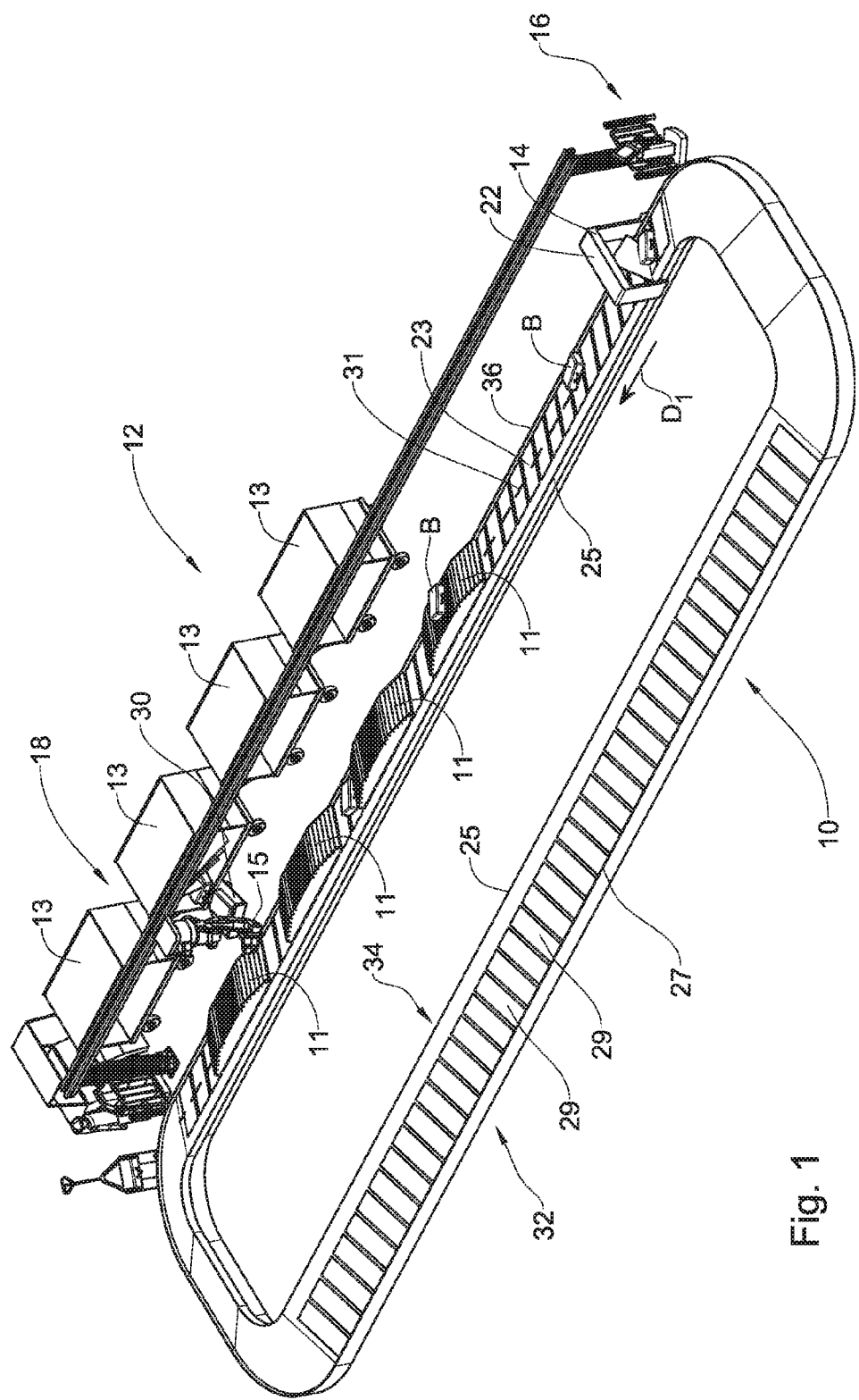
FIGS. 1 to 3 show a baggage sorting system in accordance with the presently disclosed subject matter and enlarged portions thereof (FIGS. 2 and 3)
Figure 2:
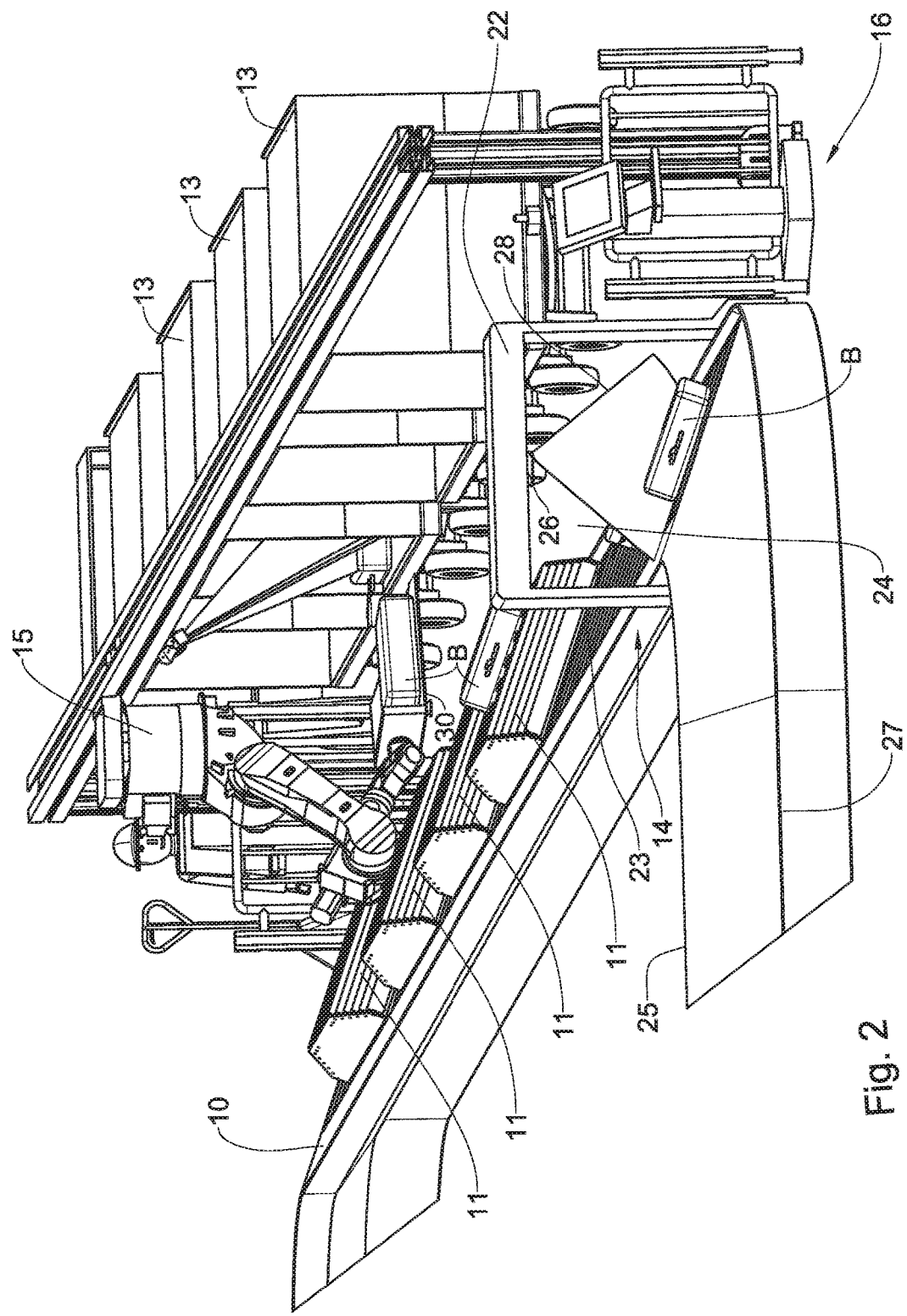
Figure 3:
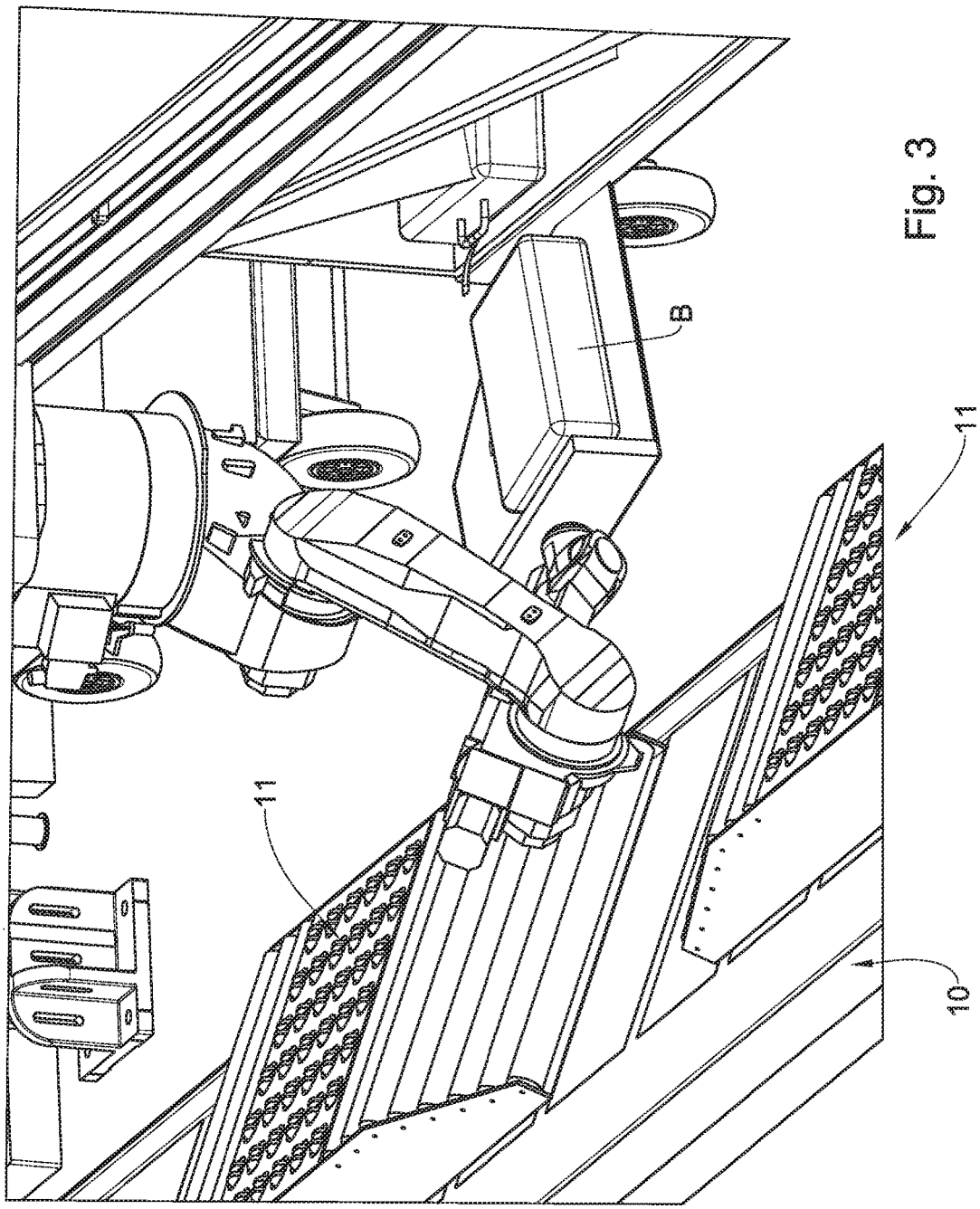

As illustrated in FIGS. 1 through 3, there is provided a baggage carousel 10, for example for use in commercial airports for transporting a baggage article (indicated at B) from a loading area to a baggage claim area and vice versa, and a baggage sorting system 12, in accordance with one example of the presently disclosed subject matter, configured for operating in association with the baggage carousel 10.

The baggage sorting system 12 is configured for sorting baggage articles B loaded on the baggage carousel 10, and comprises a baggage identification unit 14, a plurality of baggage transfer conveyor units 11, and a control unit 16.

The sorting system 12 may be configured to operate in cooperation with a collection system 18 comprising a plurality of baggage trolleys 13 and a robotic arm 15 configured for picking up each of the baggage articles B from one of the baggage transfer conveyor units 11, and transferring it inside the corresponding trolley 13, as will be further described below in detail.

The baggage carousel 10 may have a generally oblong shape, for example rectilinear with rounded corners defining a loop, and comprises a movable baggage carrying surface 23 extending between static inner and outer margins 32 and 34 terminating at respective inner and outer edges 25 and 27.

Figure 5:
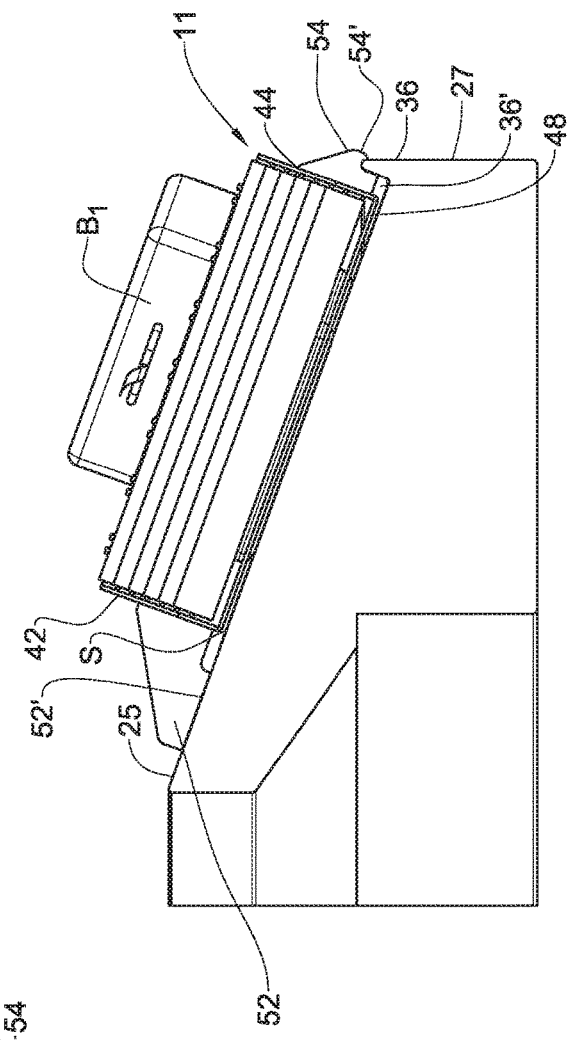
FIG. 5 shows a proximal side view of the baggage transfer conveyor unit of FIG. 4, mounted on the baggage carousel.

It will be appreciated that the terms "inner" and "outer" as used herein the presently disclosed subject matter, including the appended claims, with reference to a loop formed by the baggage carousel 10, in which the outer edge faces the direction from which the baggage is removed from the baggage carousel 10 (hereinafter "baggage removal direction"), while the inner edge is opposite the outer edge. The baggage carrying surface may be inclined such that the inner margin 32 is disposed higher the outer margin 34 with respect to a horizontal surface on which the carousel is mounted. In addition, the outer margin 34 may be formed with a stopper 36 (for example as illustrated in FIGS. 1 and 5), e.g., limiting possible lateral movement of vertical storage supports away from the carousel.

The movable baggage carrying surface 23 may comprise a plurality of conveyor slats 29, upon which the baggage articles B rest while being transported by the baggage carousel 10. The carrying surface 23 is designed to move relative to the inner and outer margins 32 and 34, for example with the slats 29 overlapping such that their edges protrude, so as to advance the baggage along a carousel transporting path 31 (shown in dotted line in FIGS. 1 and 4) in a direction of a baggage flow along the baggage carousel 10, as indicated by arrow $D_1$. Alternatively, the movable baggage carrying surface may be in the form of a belt with a textured surface for increased baggage friction.

It will be appreciated that the above description of the baggage carousel 10 is for illustration purpose only, and it may be provided according to any design, and have any suitable shape.

Referring now to FIGS. 4 to 7, there are shown in more detail the baggage transfer conveyor units 11, in accordance with one example of the presently disclosed subject matter.

Each baggage transfer conveyor unit 11 comprises a body 41 (FIG. 6) shaped as a substantially trapezoidal prism and comprising an upper, baggage receiving surface 51 (indicated in FIG. 8B), a lower surface 48 (best seen in FIG. 5), two side walls 42 and 44 having substantially trapezoidal shapes, a proximal end 41 terminating at a proximal edge 41' (FIG. 6), and a distal end 43 terminating at a distal edge 43' (FIG. 7). The baggage receiving surface 51 has a convexly curved shape and includes a proximal portion 45 extending upwardly from the proximal end 41, a distal portion 47 extending downwardly towards the distal end 43, and an upper portion 49 extending between the proximal and distal portions 45 and 47 and having an orientation generally parallel to a plane defined by edges 41' and 43'.

It will be appreciated that the terms "proximal" and "distal" as used herein the presently disclosed subject matter, including the appended claims, refer to the direction $D_1$ of the baggage flow along the baggage carousel 10.

The baggage receiving surface 51 of the baggage conveyor unit 11 defines a conveyor unit transferring path 53 (shown in dotted lines in FIGS. 4, 6 and 8B), along (including parallel to) which the baggage articles B are transferred from the proximal end 41 to the distal end 43 in a direction shown by an arrow $D_2$ (FIG. 7). It will be appreciated that the transferring path 53 lies substantially perpendicularly to the proximal edge 41' and the distal edge 43' of the baggage transfer conveyor unit 11 (as shown in FIG. 8B).

The baggage transfer conveyor unit 11 is configured for being mounted over the baggage carousel 10 such that its lower surface 48 faces the baggage carrying surface of the carousel 10, side wall 42 thereof faces the inner edge 25 of the baggage carousel 10, and side wall 44 thereof faces the outer edge 27 of the baggage carousel 10 (FIG. 5), and such that the transferring path 53 of the baggage transfer conveyor unit 11 is aligned with the carousel transporting path 31. Accordingly, the directions of baggage flow along the baggage carousel $D_1$ and of transfer of baggage articles from the proximal to distal ends of the baggage transfer conveyor unit $D_2$ are the same. Furthermore, the transporting path 31 and the transferring path 53 form a continuous path, allowing a continuous baggage flow therealong.

In order to facilitate mounting the baggage transfer conveyor unit 11 over the baggage carousel 10 as described above, it the baggage transfer conveyor unit may comprise a mounting arrangement, the structure of which is dictated by the structure of the baggage carousel 10 over which it has to be mounted.

According to some examples, the baggage transfer conveyor unit 11 comprises a mounting arrangement to facilitate mounting of the baggage transfer conveyor unit over the baggage carousel 10. The mounting arrangement may be configured for facilitating attachment to the inner and outer edges 25 and 27 of the baggage carousel 10 such that when the baggage transfer conveyor unit 11 is mounted over the carousel, its lower surface 48 is spaced from the movable baggage carrying surface 23 of the carousel by a spacing S (FIG. 5) which is sufficient to allow a free movement of the conveyor slats 29 beneath the baggage transfer conveyor unit 11 without constituting an obstacle for continuous baggage flow between the baggage carousel 10 and the baggage transfer conveyor unit 11 (i.e., along the continuous path formed by the transporting path 31 of the baggage carousel 10 and the transferring path of the baggage transfer conveyor unit 11).

As best seen in FIG. 5, the mounting arrangement may comprise a plurality of inner brackets 52 extending outwardly from the inner side wall 42 of the conveyor unit 11, configured for fixation to the inner edge 25 of the baggage carousel 10, and a plurality of outer brackets 54 extending outwardly from the outer side wall 44 of the conveyor unit 11, configured for fixation to the outer edge 27 of the baggage carousel.

The inner brackets 52 may be shaped differently from the outer brackets 54, so as to conform the shape of the corresponding margins of the carousel to which they are fixed or attached. The conveyor unit does not need to have a number of brackets on each of its sides, but may be provided with one elongated bracket or other mounting arrangement.

Figure 4:
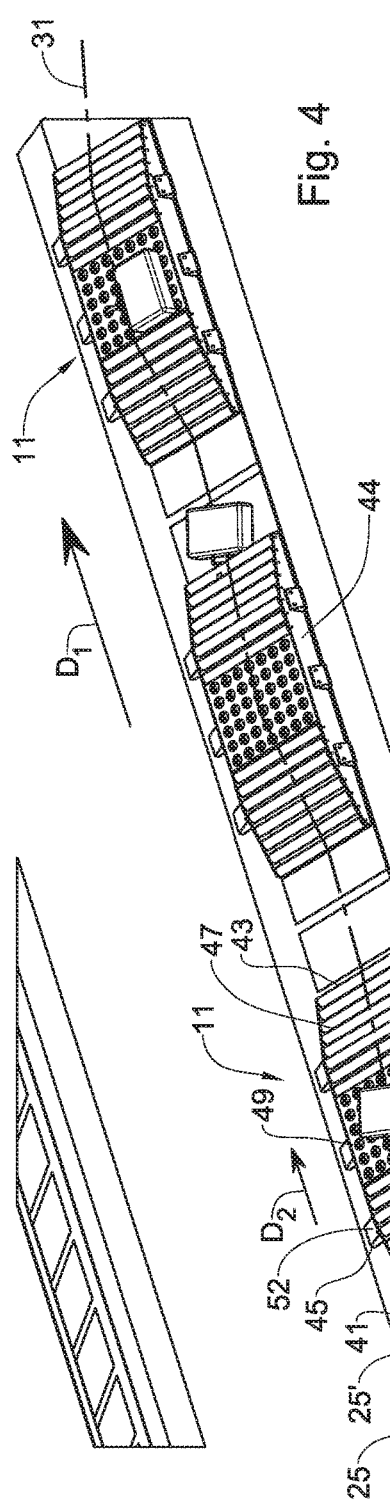
FIG. 4 shows a portion of a baggage carousel with several baggage transfer conveyor units in accordance with the presently disclosed subject matter, mounted thereon.

As shown in FIGS. 4 and 5, the edge 25 of the baggage carousel 10 is in the form of a flat surface and lower surfaces 52' of the inner brackets 52 are thus also flat to allow their direct contact with the edge 25 (on which it may either lie or be affixed, for example by clamping). The edge 27 of the baggage carousel 10 and its protruding stopper 36 form therebetween a pocket 36' (FIG. 5) and each outer bracket 54 is formed with a corner portion 54' configured to be received in the pocket 36' and a stopper receiving portion 54 configured to receive therein the stopper 36 to engage the stopper.

It should be indicated that due to the inclination of the baggage carrying surface of the carousel, the conveyor unit 11 is held solely by its weight and the its outer bracket 54 against the protruding stopper 36 of the carousel.

The baggage transfer conveyor unit 11 further comprises a transferring mechanism, by means of which the baggage articles B are transferred along its transferring path 53. Generally, the transferring mechanism comprises a baggage moving arrangement for advancing the baggage articles B along the transferring path 53 in a direction and at a speed corresponding to those provided by the baggage carousel 10, and activation means for activating the baggage moving arrangement.

Referring to FIGS. 6 to 8B there is shown one example of the baggage moving arrangement in accordance with the presently disclosed subject matter, comprising an array of elongated proximal transferring rollers 57 disposed and equally spaced along the proximal portion 45 and an array of distal transferring rollers 59 disposed and equally spaced along the distal portion 47.

The transferring rollers 57 and 59 have axes $a_1$ to $a_n$ (FIGS. 6 and 7) and are held in place between the inner and the outer lateral sides 42 and 44 of the baggage transfer conveyor unit 11 such that their axes are parallel to each other and are substantially perpendicular to the transferring path 53 and such that they are rotatable about their corresponding axes $a_1$ to $a_n$ in the same clockwise direction $D_3$ (FIG. 7) relative to the directions $D_1$ and $D_2$, so as to advance the baggage along the proximal portion 45 and the distal portion 47 of the baggage transfer conveyor unit 11 in the direction $D_2$.

As shown in FIG. 7, the direction $D_2$ is convexly curved and comprises an initial upward direction (along the proximal portion 45), an intermediate horizontal direction (along the upper portion 49) and a final downward direction (along the distal portion 47).

The transferring activation means (not shown) is configured for activating and deactivating the rotation of the transferring rollers 57 and 59 and for controlling the speed of the rotation to conform to the speed of the movement of the carousel slats 29.

The baggage moving arrangement may comprise baggage moving elements disposed only along the proximal and distal portions 45 and 47 of the baggage transfer conveyor unit 11, as described above, or it may also comprise such elements disposed along the upper portion 49. The baggage moving arrangement of the upper portion 49 may be similar to or different from that of the proximal and distal portions, and may be controlled independently therefrom.

Optionally, the baggage moving arrangement may be a single continuous element, such as a belt extending along the baggage transfer conveyor unit 11 and defining an upper surface thereof, which may be textured to increase friction with the baggage.

The baggage transfer conveyor unit 11 further comprises a diverting mechanism 81, one example of which is shown in FIGS. 6 to 10, and which allows at least the following two modes of operation of the conveyor unit 11:

a transferring mode of operation (FIGS. 6 to 9B), in which the diverting mechanism 81 allows transferring the baggage articles B along the transferring path 53; and a diverting mode of operation (FIGS. 9C and 10), in which the diverting mechanism 81 provides diverting the baggage articles B away from the transferring path 53, as described in detail below.

The term "divert" or "diverting" in the context of the presently disclosed subject matter refers to at least changing the direction of the baggage with respect to its original direction of movement along the transferring path of the baggage transfer conveyor unit, and possibly advancing it along a direction different from that of the transferring path.

To enable the above modes of operation in the example illustrated in FIGS. 6 to 10, the diverting mechanism is associated with the upper portion 49 of the conveyor unit 11, to allow the upper portion 49 to move the baggage in the same direction as the proximal and distal portions of the conveyor unit 11 in the above transferring mode of operation, and change the direction of the baggage movement along the upper surface in the above diverting mode of operation. The conveyor unit or the diverting mechanism further comprises a controller (not shown) for controlling the diverting mechanism, for switching between the above modes of operation.

Figure 9A:
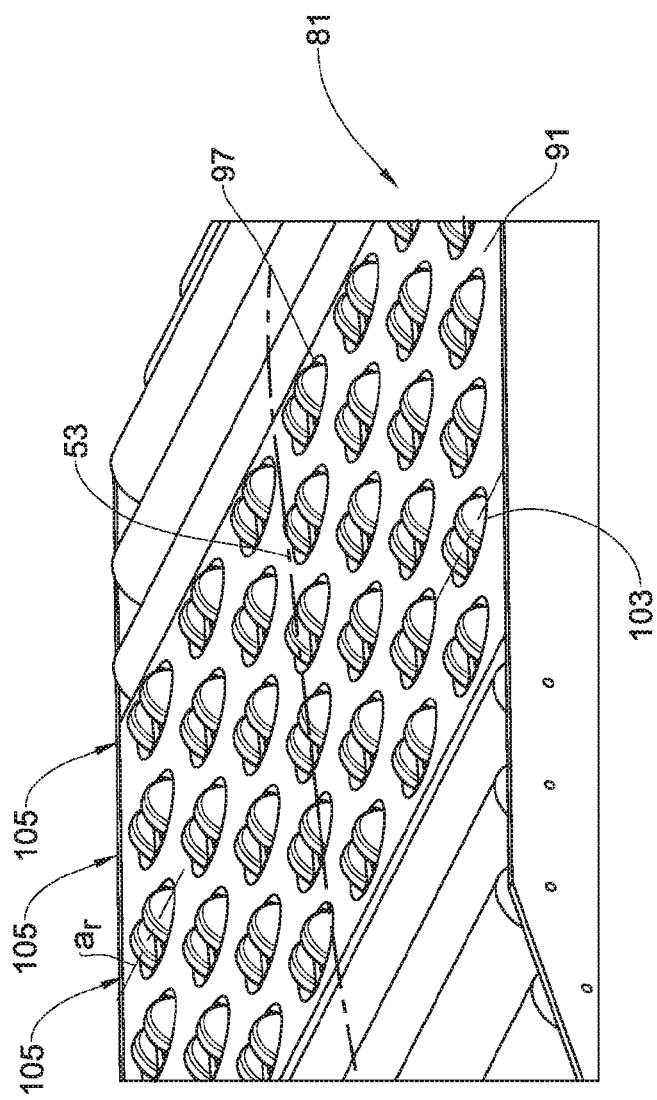
FIG. 9A shows a top perspective view of a top portion of the baggage transfer conveyor unit of FIGS. 8A and 8B, having a movable arrangement in accordance with one example of the presently disclosed subject matter.
Figure 9C:
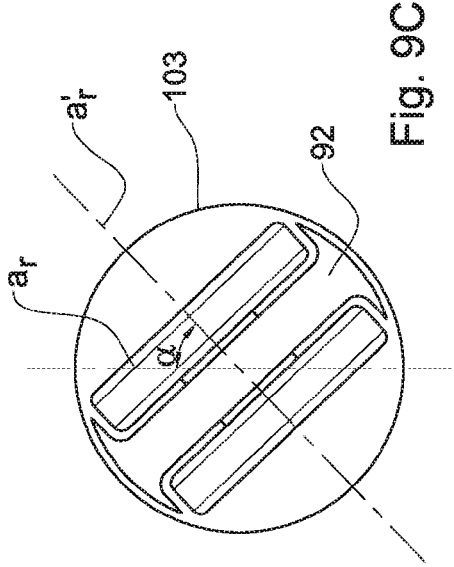
FIG. 9C shows the movable arrangement of FIGS. 9A and 9B in a diverting mode of operation.
Figure 9B:
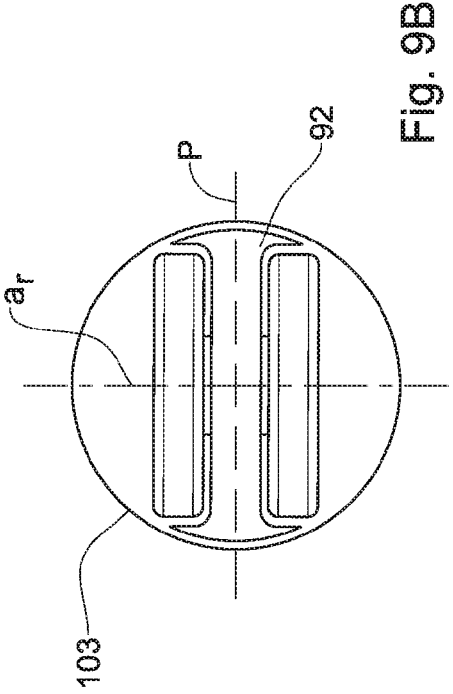
FIG. 9B shows the movable arrangement of FIG. 9A in a transferring mode of operation.

In the example of FIGS. 6 to 10, the diverting mechanism 81 comprises a plurality of rolling inserts 97 disposed within a corresponding a plurality of openings 103 (FIGS. 9A to 9C) formed in the upper portion 49 and arranged in parallel rows 105 (FIG. 9A). Each of the rolling inserts 97 is fitted within a pivotal support 92 (FIGS. 9B and 9C), which is mounted within the corresponding opening 103. The rolling inserts 97 are rotatable about their axes $a_r$, which are parallel to each other and are perpendicular to a pivoting axis P of the pivotal support 92, which has a generally vertical orientation. The operation of the rolling inserts and the pivotal support is controlled by the controller such that, in the transferring mode of operation of the conveyor unit 11 (FIGS. 6 to 9B), the diverting mechanism allows the pivotal supports 92 to be held in their normal position, such that the axes $a_r$ of the rolling inserts 97 are parallel to the axes of rotation of the rollers 57 and 59 of the proximal and distal portions 45 and 47 of the conveyor unit, being thus perpendicular its transferring path 53 (hereinafter 'normal orientation' of the axes $a_r$). With such normal orientation of the axes $a_r$, the controller causes the rolling inserts to rotate clockwise in order to transfer the baggage articles B along the transferring path 53. In the diverting mode of the conveyor unit 11, the controller causes the pivotal supports 92 to pivot about their axes until they are brought into a diverting orientation (FIGS. 9C and 10), in which the axes $a_r$ of the rolling inserts 97 form an angle $\alpha$ (FIG. 9C) with their normal orientation (hereinafter 'diverted orientation' of the axes $a_r$). With such diverted orientation of the axes $a_r$, and the rolling inserts continuing their clockwise rotation, the diverting mechanism diverts the baggage articles B transferred by the proximal portion 45 of the baggage transfer conveyor unit 11 to the upper portion 49 thereof, from the transferring path 53, thereby preventing it from being transferred down to the baggage carousel 10 along the distal portion 47 of the baggage transfer conveyor unit 11.

The angle $\alpha$ may be any angle set by the controller. Optionally, the angle may vary depending on the direction, in which different baggage articles B have to be diverted, i.e., for diverting a first baggage article $B_1$, the pivotal support 92 will be pivoted such that the angle $\alpha$ has a first value $\alpha_1$, while for diverting a second baggage article $B_2$, the pivotal support will be pivoted such that the angle $\alpha$ has a value $\alpha_2$ different from $\alpha_1$.

According to some examples, the control unit 16 is configured to operate the rolling inserts 97 to rotate a baggage article B thereupon. This may be accomplished by adjusting the angles $\alpha$ of each of the rolling inserts 97, and or by selectively driving each of the rolling inserts at different speeds and/or directions. The orientation of each of the baggage articles B may be detected by any suitable means.

Referring now to FIGS. 11 to 14, there is shown another example of a baggage transfer conveyor unit, generally designated 111.

The baggage transfer conveyor unit 111 comprises the same basic elements as the baggage transfer conveyer unit 11, some of which are designated with corresponding reference numerals added to 100. In particular, the conveyor unit 111 comprises a body 113 with a baggage transferring surface including a proximal portion 145, an upper portion 149, a distal portion 147, ends 141 and 143 and side walls 142 and 144; a transferring mechanism comprising a plurality of elongated transferring rollers 157, 156 and 159 rotatable about the corresponding axes $a'_1$ to $a'_n$ (FIG. 12); and a diverting mechanism 181.

The only differences between the conveyor unit 111 and the conveyor unit 11 is in the structure of the upper portion 149, the structure of the side walls 142 and 144 and the body of the conveyor disposed under the upper portion 149, and the diverting mechanism 181, as described in detail below.

The upper portion 149 comprises the same kind of moving elements as those disposed along the proximal and distal portions 145 and 147 of the baggage transfer conveyor unit 111. The rollers 156 of the upper portion 149 are fixed at their ends to upper sections 142' and 144' of the side walls 142 and 144 with the possibility to rotate about their axes in the same manner as the rollers 157 and 159 of the distal and proximal portions 145 and 147.

The rollers 156 are spaced from each other along their entire length by a spacing s' (not seen), and the upper sections 142' and 144' of the side walls 142 and 144 are formed with vertical slots 160 aligned with the spacing between the rollers, i.e., disposed between the locations of the side walls, at which the rollers our fixed thereto. The spacing between the rollers 156 and the vertical slots 160 form in the body of the conveyor 111 a plurality of passages 162.

The diverting mechanism 181 comprises a stand assembly 118 in which two parallel stands 121 and 123 are spaced from each other to a distance greater than that between the side walls 142 and 144 of the conveyor 111. Each stand 121 and 123 holds a plurality of pulleys 126 and 128, respectively, rotatably mounted on axels 125 and 127. The number of the pulleys corresponds o the number of passages 162 and they are spaced along the axels 125 and 127 by the same spacing as the passages 162.

The stand assembly 118 is held by the body 113 of the conveyor unit 111 with a possibility of vertical movement relative thereto and such that each stand is disposed externally with respect to the respective side wall. The stands 121 and 123 are mounted such that the axels 125 and 127 are parallel and coplanar and their pulleys 126 and 128 are aligned with the passages 162.

The diverting mechanism 181 further comprises endless strap loops 122 each extending between one pair of opposite pulleys 126 and 128 aligned with one of the passages 162.

Figure 13:
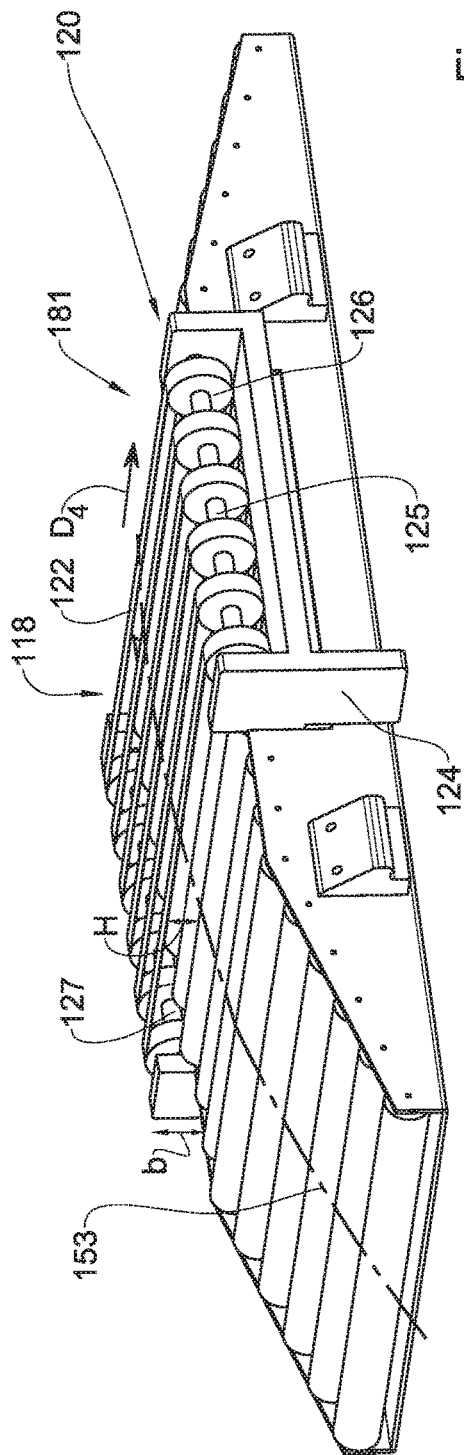
FIGS. 13 and 14 show a front perspective view of the baggage transfer conveyor unit of FIGS. 11 and 12, wherein the movable arrangement thereof in its diverting mode of operation.
Figure 14:
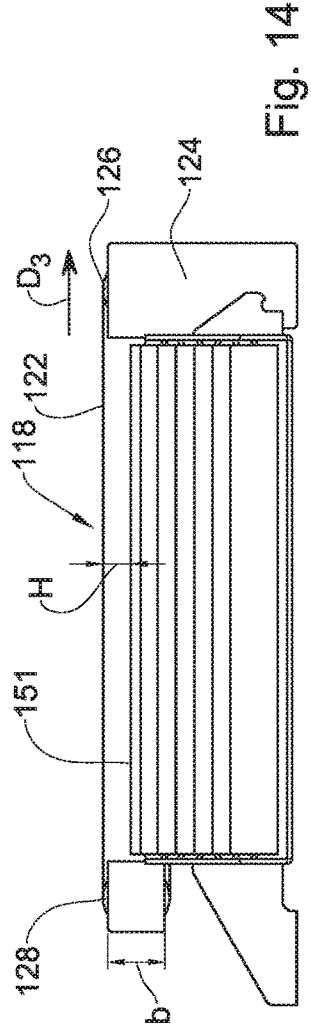
Figure 15:
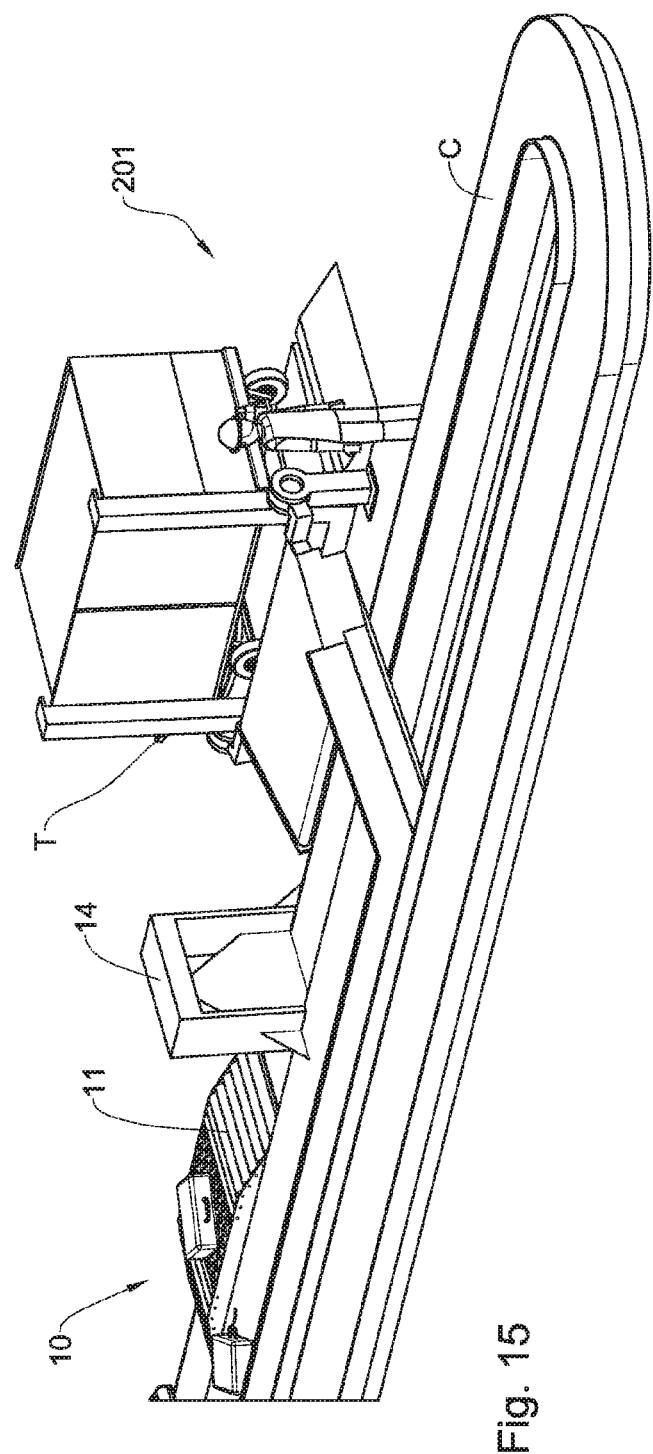
FIG. 15 shows a baggage unloading device in accordance with one example of the presently disclosed subject matter, used together with the baggage sorting system of FIG. 1.

The strap loops 122 each having a width w (FIG. 11) smaller than the spacing s' between the rollers 156, thereby allowing the strap loops 122 to be moved along the slots 160 when the stand assembly is moved in the vertical direction, between a lowered position, in which the strap loops 122 are disposed so as not to protrude upwardly relative to the rollers 156 (FIGS. 11 and 12) and a raised position, in which they protrude upwardly from the rollers 156 (FIGS. 13 and 14).

The diverting mechanism 181 has a transferring mode of operation (FIGS. 11 and 12), in which the strap loops 122 are disposed so as not to protrude upwardly relative to the rollers 156 and allow the rollers 156 to perform their transferring operation in synchronization with the rollers 157 and 159 of the proximal and distal portions 145 and 147 of the conveyor 111

The diverting mechanism 181 further has a diverting mode of operation (FIGS. 13 and 14), in which the stands is the strap loops 122 are raised so as to protrude upwardly from the rollers 156 (FIGS. 13 and 14) and the pulleys 126 and 128 are rotated about the axels 125 and 127 as shown by an arrow $D_4$ (FIG. 13).

The arrangement is such that when the diverting mechanism 181 is at its transferring mode of operation, the strap loops 122 are kept in their normal lowered position, allowing thereby the baggage articles B to be transferred along the transferring path 153. When the baggage article B which is supposed to be diverted reaches the upper portion 149, the diverting mechanism 181 is controlled to change its normal mode to its diverting mode of operation by the activating means, the strap loops 122 are brought to their raised position, in which their rotation causes the baggage articles B to be directed to a direction perpendicular to that of the transferring path 153.

The height H defining the raised position of the strap loops in the diverting mode of operation has to be such that the baggage does not contact the transferring rollers 156 and is diverted by the strap loops 122 without interference therewith.

It should be appreciated that the diverting mechanisms described above are configured to operate at their diverting mode of operation for any predetermined time, sufficient to displace the baggage from the transferring path and prevent it from continuing to the distal portion of the baggage transfer conveyor unit 111.

Such time may be calculated as following: if an average dimension (height, width and/or length) is X m, and a speed of the baggage movement along the baggage transfer conveyor unit 111 is Y msec, an average time of duration of the diverting mode of operation is X/Y sec. For example, if an average dimension is about 2 m, and a speed of the baggage movement along the baggage transfer conveyor unit 111 is about 0.45 msec, an average time of duration of the diverting mode of operation is about 4 sec.

However, the above speed and duration of the diverting mode of operation may vary and may be changed between different kinds of baggage and in accordance with specific parameters of the baggage.

Reverting to FIGS. 1 and 2, an operation of the baggage sorting system 12 will now be explained in detail.

The baggage sorting system 12 shown in FIGS. 1 and 2 is used for handling checked-in baggage transported by the baggage carousel 10 from the departure terminal, by sorting the baggage to its corresponding baggage trolley 13.

As indicated above, the baggage sorting system 12 comprises the baggage identification unit 14, the plurality of baggage transfer conveyor units 11 (which may be any unit in accordance with the examples described above), and the control unit 16.

The baggage identification unit 14 comprises a recognition tunnel 22, formed as a gate surrounding the baggage carousel 10, and having a passage 24 through which the baggage articles B transported by the baggage carousel pass.

The recognition tunnel 22 comprises a barcode reader 26 (which may be, for example, an omni-directional barcode reader) and a laser scanner (schematically shown as 28), and is configured for identifying each baggage article B based on its barcode assigned thereto at the departure terminal.

The control unit 16 (which is schematically represented in FIG. 1) is configured for:
 (a) receiving information from the baggage identification unit 14;
 (b) identifying a trolley 13 to which each baggage article B is to be loaded;
 (c) matching between the identified baggage article B and a corresponding baggage transfer conveyor unit 11 associated with the above identified trolley 13;
 (d) obtaining baggage parameters such as for example its location on the baggage carousel 10, a distance from the corresponding baggage transfer conveyor unit 11 and its general dimensions;
 (e) activating the diverting mechanism of the above corresponding baggage transfer conveyor unit 11, by converting it to its diverting mode of operation, when the baggage reaches a location on the corresponding baggage transfer conveyor unit 11 at which it may be diverted (for example the upper portion 49); and
 (f) activating the collection system 18, and, in particular, the robotic arm 15, to collect the diverted baggage from the corresponding baggage transfer conveyor unit 11, and to transfer it to the corresponding trolley 13.

Based on the information of the baggage parameters, the control unit 16 determines a time and a duration of the diverting mode of operation of the diverting mechanism, while the rest of the time the diverting mechanism is at its transferring mode of operation.

The robotic arm 15 comprises a collecting tray 30 by means of which it collects the baggage from the baggage transfer conveyor unit 11 and transfers it into the trolley 13. Optionally, the robotic arm 15 may be controlled to load the baggage at a predetermined location within the trolley.

It should be appreciated that the baggage may pass one or more baggage transfer conveyor units on its way to the baggage transfer conveyor unit from which it has to be diverted. In such case, these one or more baggage transfer conveyor units operate at their transferring mode of operation, allowing the baggage to be transferred therealong, wherein the transferring paths thereof form one continuous path with the transporting path of the baggage carousel.

The baggage transfer conveyor units may be arranged such that each unit is associated with its corresponding trolley, in which case each unit substantially faces its corresponding trolley (as shown in FIGS. 1 and 2).

Optionally, a baggage transfer conveyor unit may be associated with more than one trolley, in which case the control unit 16 will also determine the diverting direction based on the disposition of the trolleys with respect to the baggage transfer conveyor unit.

Figure 16:
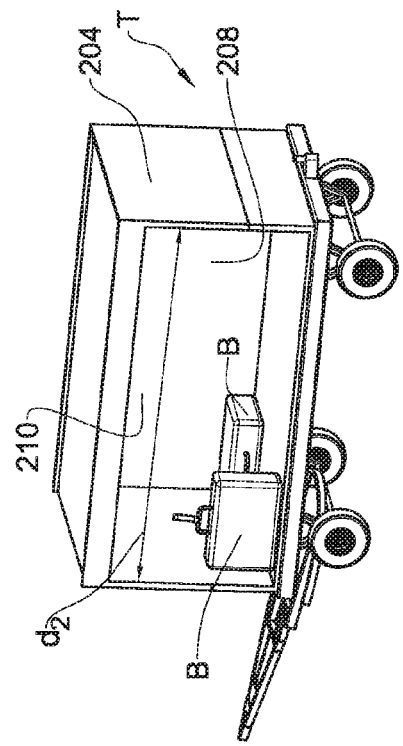
FIG. 16 shows a front perspective view of a trolley generally used in the art.
Figure 18B:
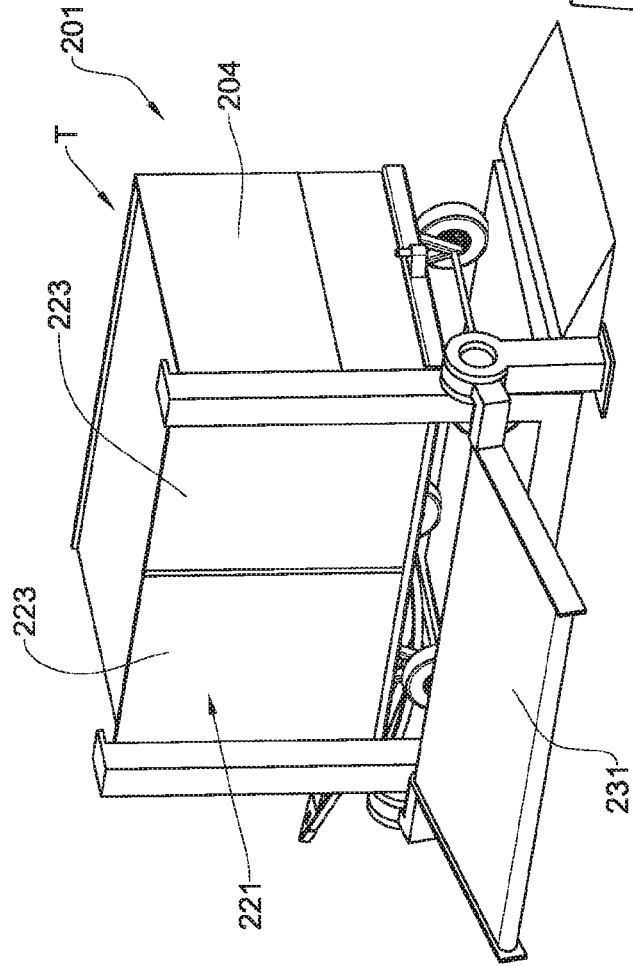
FIGS. 18A and 18B show front and back perspective views, respectively, of a baggage unloading device with a gradual release arrangement thereof in accordance with one example of the presently disclosed subject matter, with a trolley mounted thereon.
Figure 18A:
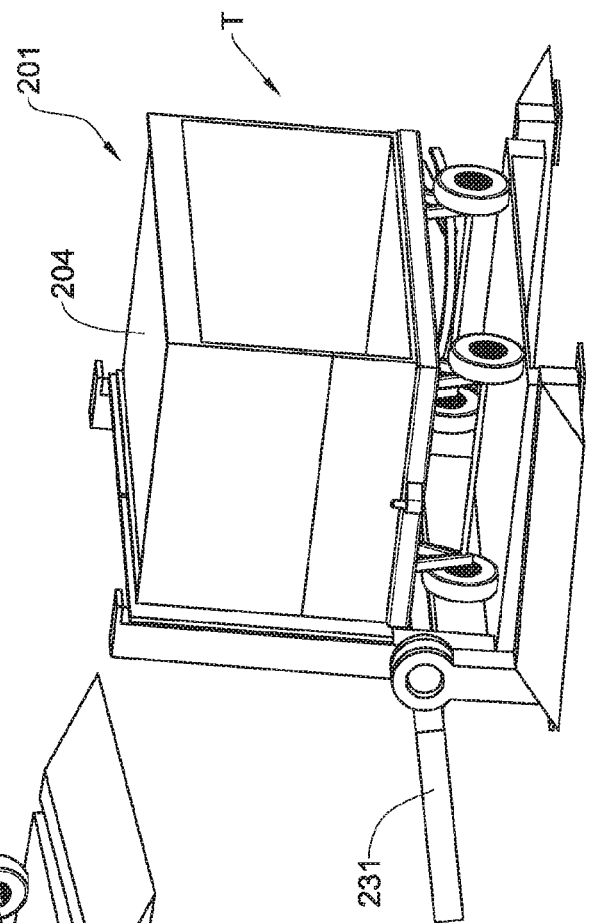
Figure 19A:
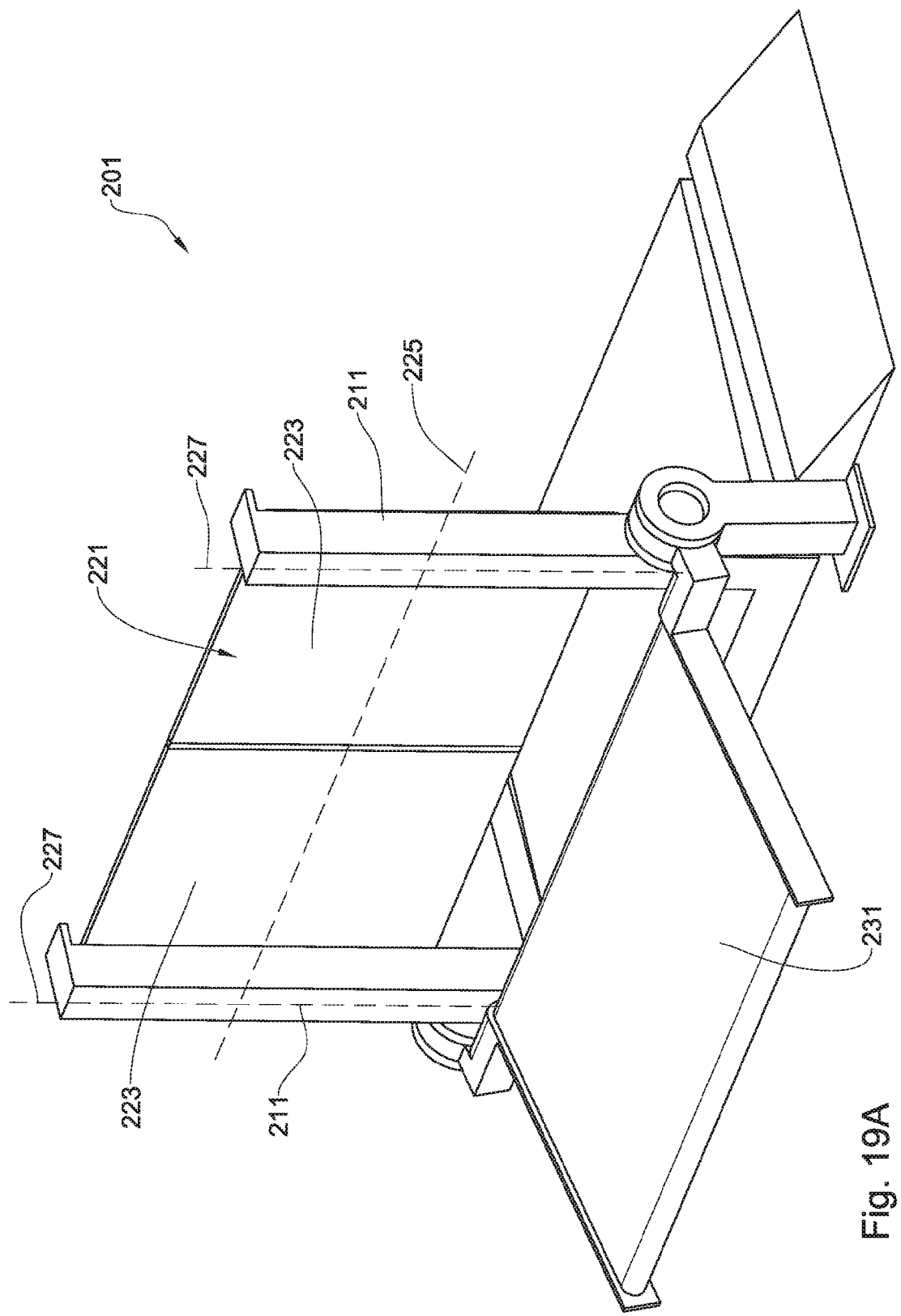
Figure 20:
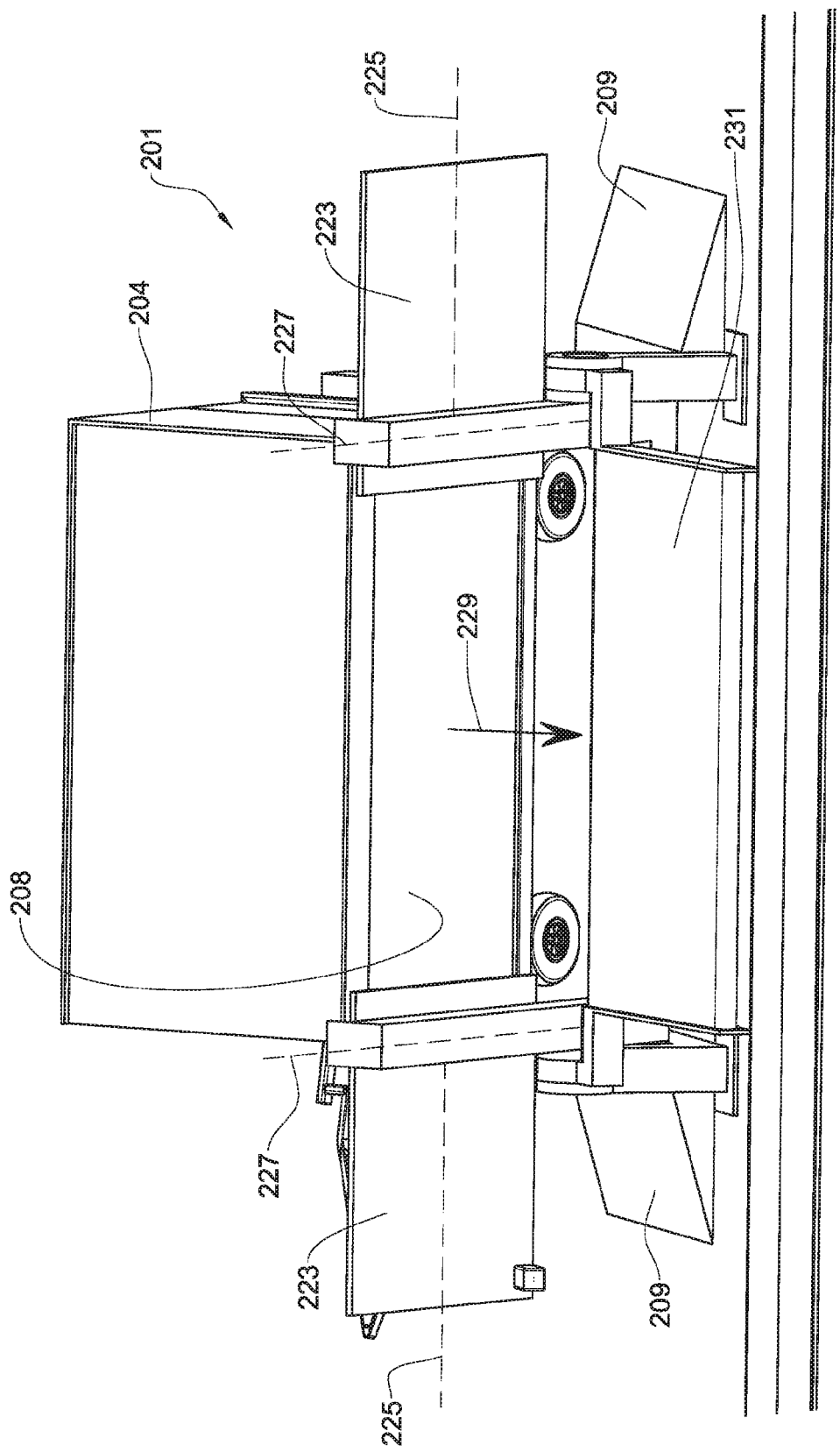
FIG. 20 shows a front perspective view of the baggage unloading device of FIGS. 18A to 19C, together with the trolley mounted thereon, in a second position thereof.
Figure 21A:
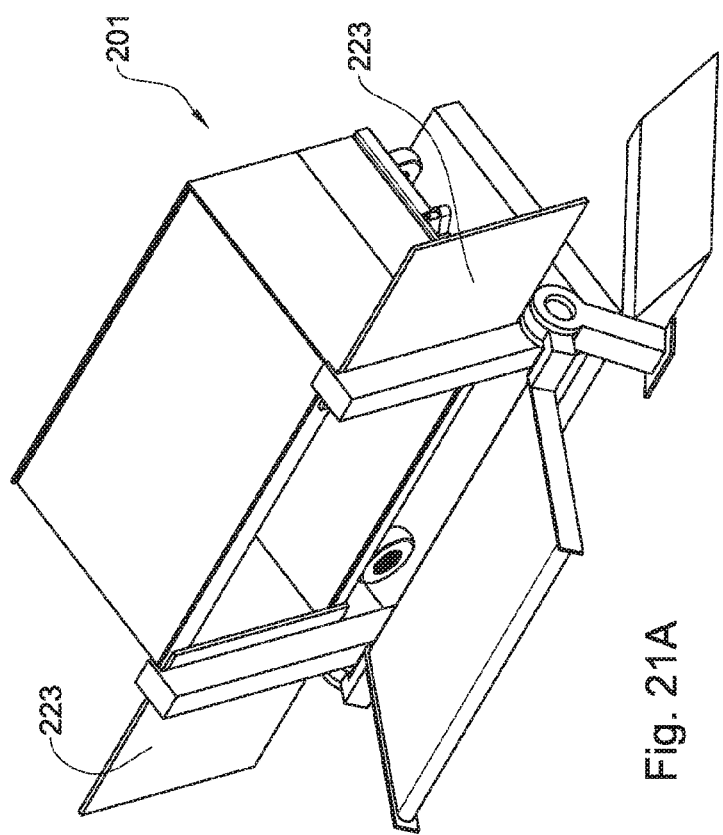
FIGS. 21A and 21B show a front perspective view and a back perspective view, respectively, of the baggage unloading device of FIG. 20.
Figure 21B:
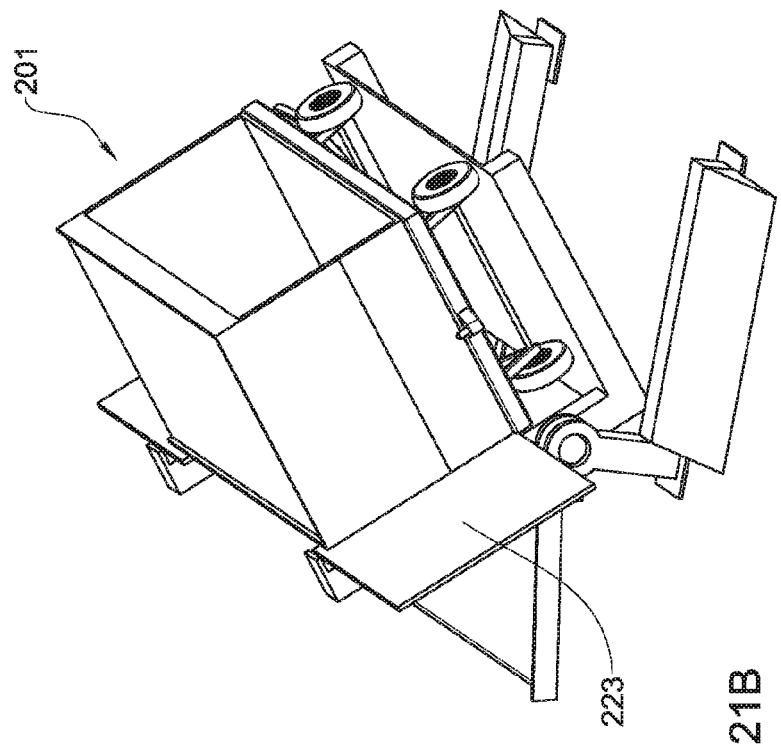
Figure 22:
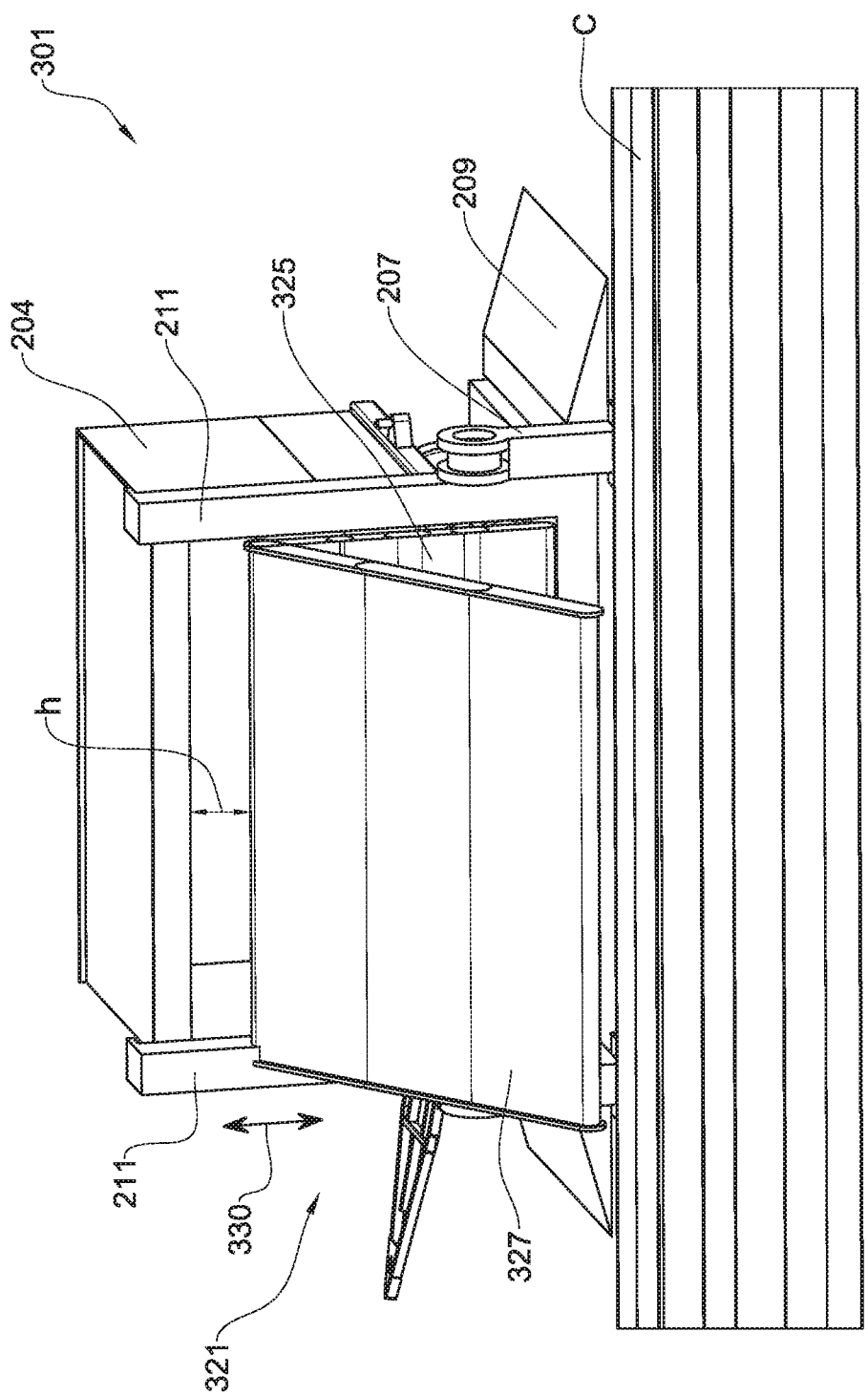
FIG. 22 shows a front perspective view of a baggage unloading device with a gradual release arrangement thereof in accordance with another example of the presently disclosed subject matter, shown together with a trolley mounted thereon.
Figure 23A:
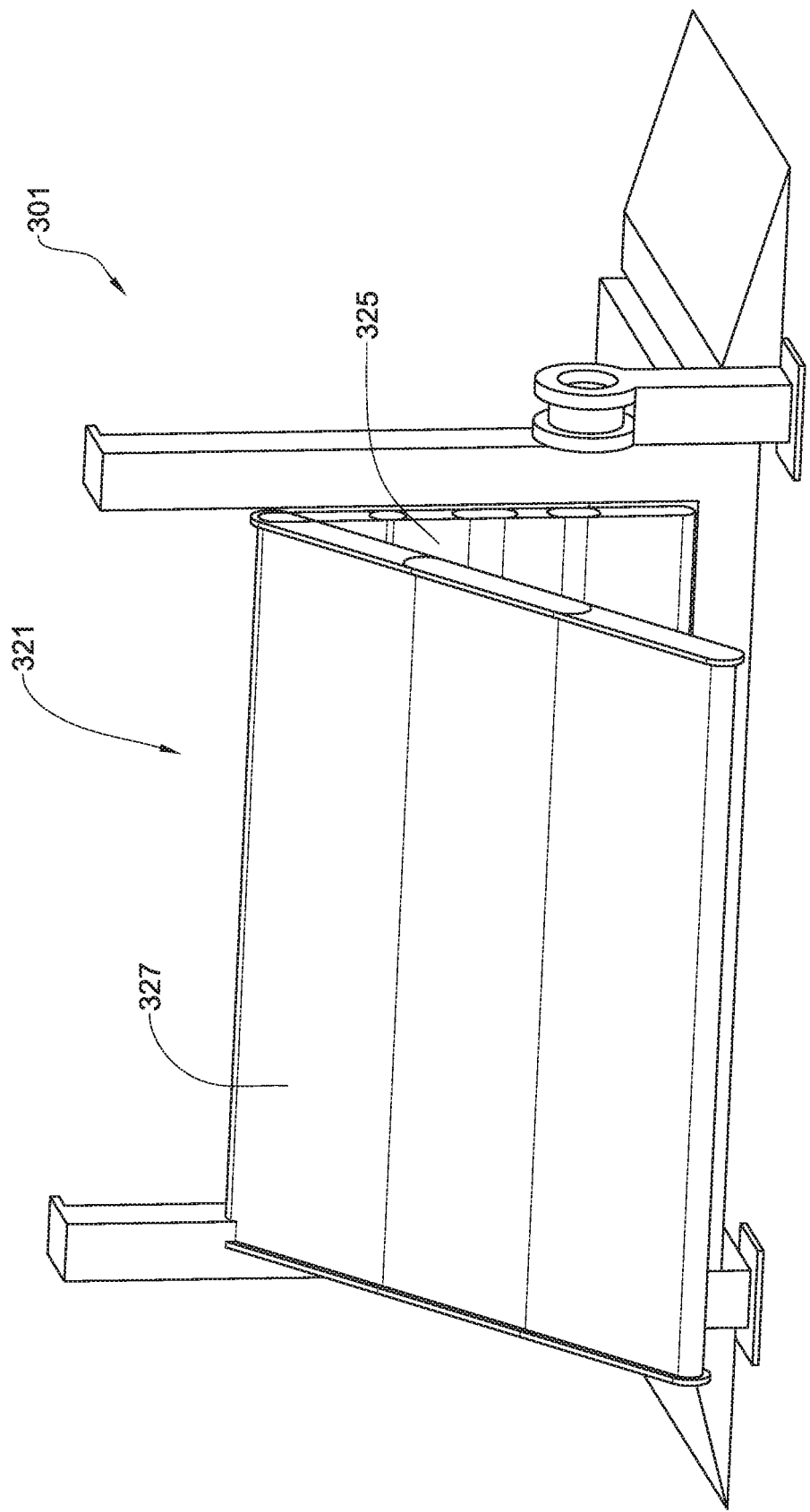
Figure 24:
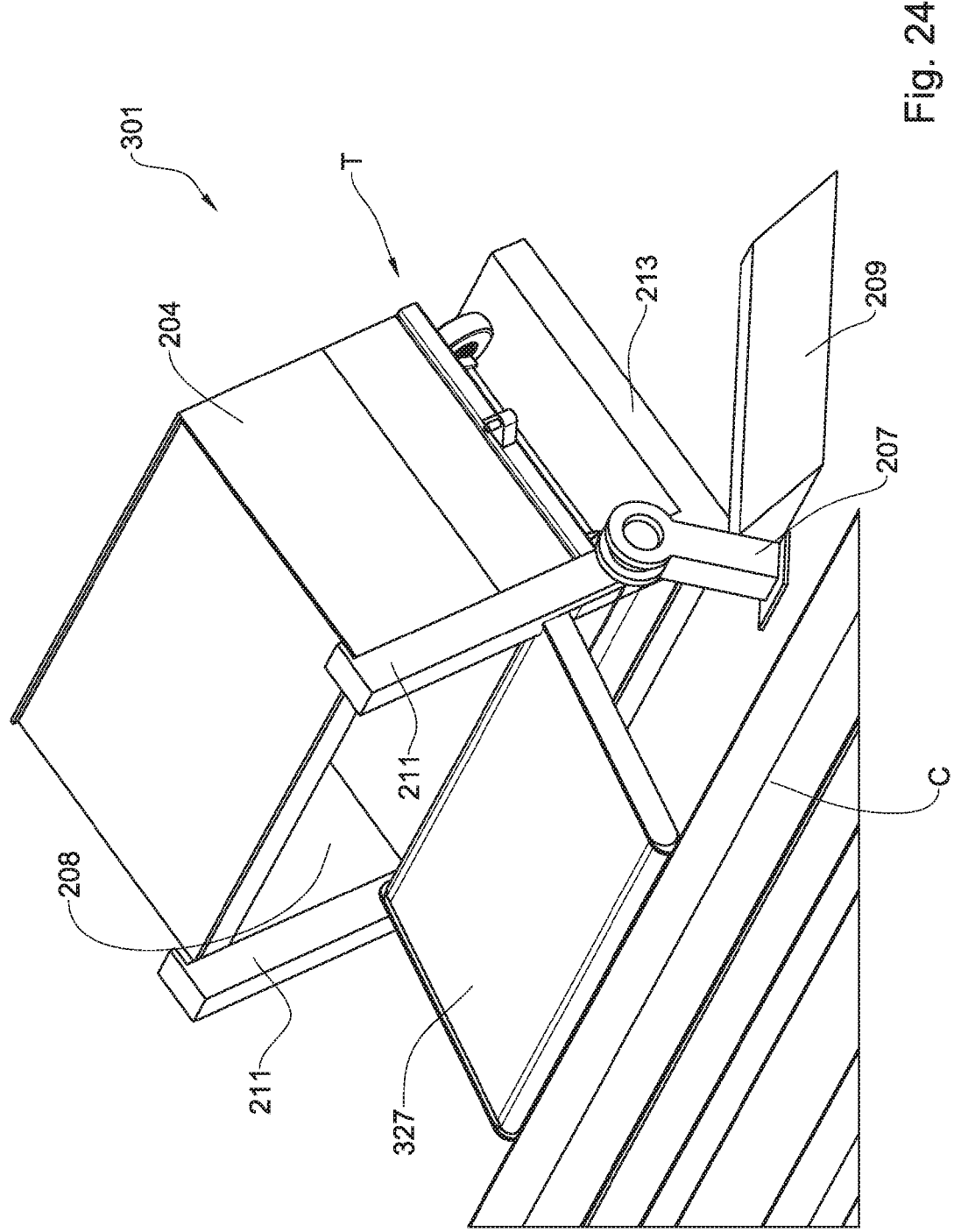
FIG. 24 shows a front perspective view of the baggage unloading device of FIGS. 22 to 23C, together with the trolley mounted thereon, in a second position thereof.
Figure 25A:
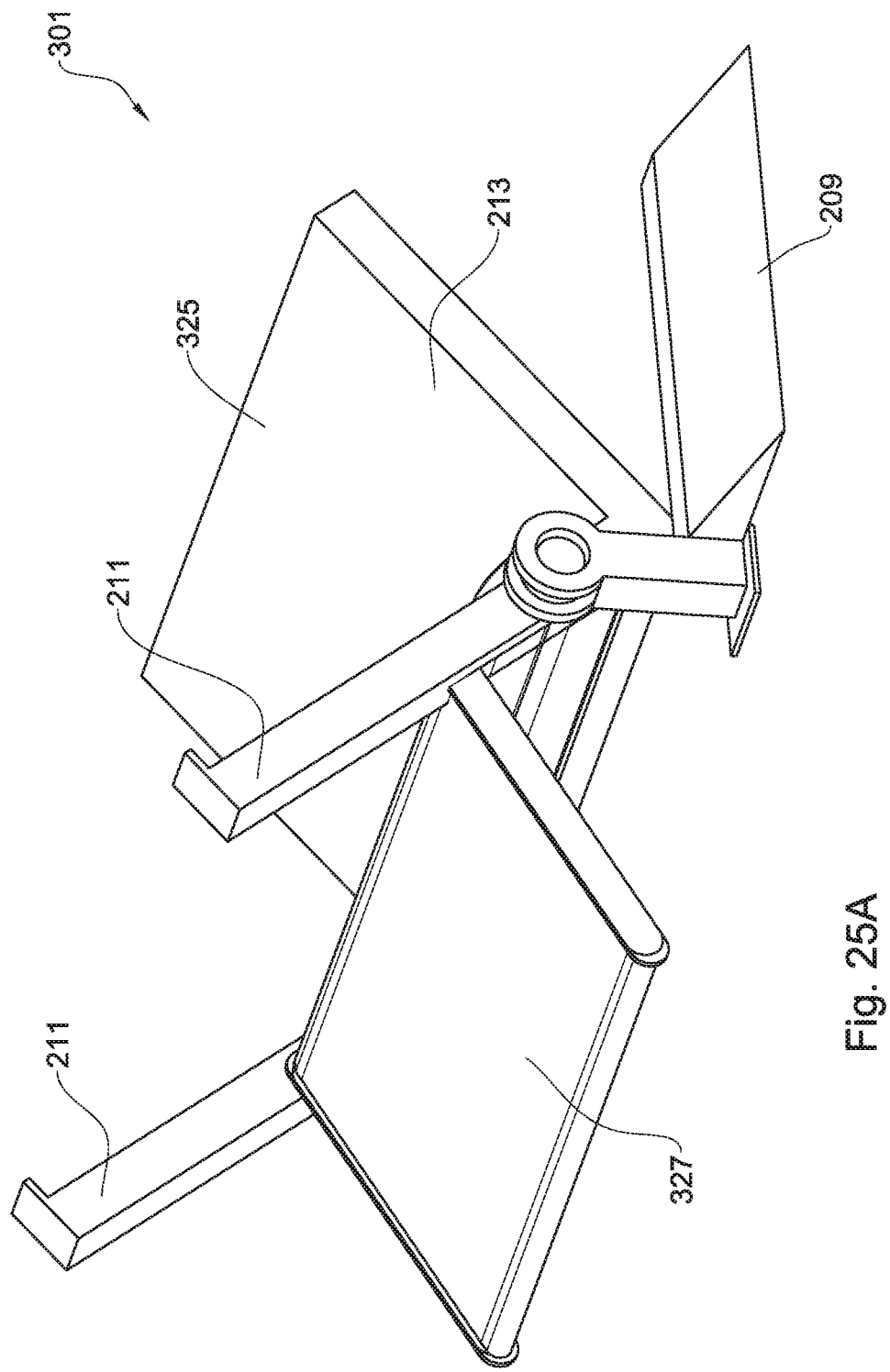

Referring now to FIGS. 15 to 25C, there are shown baggage unloading devices 201 and 301 (FIGS. 22 to 25C), in accordance with the presently disclosed subject matter, which may also be used with the baggage sorting system 10 as disclosed above. Generally, the unloading devices 201 and 203 are used with standard baggage trolleys T (one example of which is shown in FIG. 16), such that the trolley with a baggage article B to be unloaded is placed within the baggage unloading device, and is then within the device to a position allowing the bags to be unloaded from the trolley by means of gravitation onto a baggage carousel C.

The trolley T (shown separately in FIG. 16) usually comprises a baggage storage compartment 204 in which the baggage article B to be unloaded is stored, and a storage compartment carriage 202. The baggage storage compartment 204 has a front face 206 forming an opening 208 to an interior 210 thereof, i.e., wherein baggage articles B are stored.

The unloading devices 201 and 301 comprise a stationary assembly 203 and a rotating support assembly 205 rotatingly attached to the stationary assembly 203 and configured for mounting thereover the trolley T with the baggage articles B therewithin.

The stationary assembly 203 comprises a pair of vertical holders 207 and a pair of lateral supports 209, and the support assembly 205 comprises a pair of vertical storage supports 211 rotatingly attached to the vertical holders 207, and a trolley mounting stage extending substantially perpendicular to the storage support rods 211, for mounting thereover the trolley T with the baggage articles B therewithin.

The support assembly 205 is configured for rotating with respect to the stationary assembly 203 between at least a first, horizontal position (FIG. 17A), in which the trolley mounting stage 213 is substantially parallel to a horizontal plane P (FIG. 17A), on which the stationary assembly 203 is mounted, and a second, tilted position (FIG. 17B), in which the support assembly 205, and in particular the mounting stage 213 forms an angle a with respect to the plane P.

The vertical storage supports 211 define an opening 215 therebetween, dimensions of which substantially conform with the dimensions of the opening 208 of the baggage storage compartment 204 of the trolley T, and in particular a distance $d_1$ between the vertical storage supports 211, constituting a width of the opening 215 substantially conforms with a width $d_2$ (FIG. 16) of the opening 208.

The baggage unloading devices 201 and 301 further comprise a lifting mechanism 217 (not shown) configured for converting the stationary assembly 203 between the above first and second positions. It should be appreciated that FIG. 17B show only one of a plurality possible second positions, in which the support assembly 205 is tilted with respect to the stationary assembly 203, and the mounting stage 213 forms a variety of angles a with respect to the horizontal plane P.

The angle a may vary between 0° and 90°, depending on the amount and/or parameters of each baggage article B to be unloaded. Optionally, the lifting mechanism 217 may be configured for converting the support assembly between several predefined discrete positions, each associated with a different angle a.

The baggage unloading devices 201 and 301 further comprise a gradual release arrangement for gradually varying an extent to which the opening 215 is exposed so as to gradually expose the opening 208 of the baggage storage compartment 204 to an exterior.

As illustrated in FIGS. 18A to 21B, a gradual release arrangement 221 of the baggage unloading device 201 may comprise a pair of doors 223, each door attached to a corresponding vertical storage support 211 and configured to move along an axis 225 (FIGS. 19A and 20) substantially perpendicular to axes 227 of the vertical storage supports 211, so as to gradually increase or decrease a width of an exposed portion of the opening 208.

The arrangement is such that when the trolley T is mounted over the mounting stage 213 and the baggage articles B loaded thereon are to be unloaded to the baggage carousel C, the lifting mechanism 217 is activated to rotate the support assembly 205 so as to increase the angle a. As the support assembly 205 rotates and the mounting stage 213 is lifted and tilted the gradual release arrangement 221 is activated such that the doors 223 gradually move to enlarge the opening 215 and gradually expose the opening 208 to allow the baggage articles B to be unloaded therefrom.

Due to the tilted position of the baggage storage compartment 204, caused by the tilted position of the mounting stage 213 on which it is mounted and gradual exposure of the opening 208, the baggage is released gradually due to a gravitational force in a baggage flow direction (shown by an arrow 229 in FIGS. 19B and 20), which may be substantially perpendicular to the axis 225 along which the doors move.

The baggage unloading device 201 further comprises an unloading bridge 231, which is tilted with respect to the horizontal plane P and attached to the stationary assembly 203, so as to extend outwardly with respect to the opening 215, between the opening 215 of the support assembly 205 and the baggage carousel C. The unloading bridge 231 allows further gradual release of the baggage articles B towards the baggage carousel C.

It should be indicated that the doors of the gradual release arrangement in accordance with the presently disclosed subject matter, may slide along a single axis as described above, or may be rotatably mounted to the elements of the support assembly 205, such as the vertical storage supports 211, so as to be gradually opened outwardly with respect to the interior of the baggage storage compartment 204 to allow the baggage release.

Optionally, the gradual release arrangement may comprise only one door or several doors, opening of which allow the above gradual release of the baggage.

Referring now to FIGS. 22 to 25C, there is shown the baggage unloading device 301 comprising gradual release arrangement 321, in accordance with another example of the presently disclosed subject matter.

The gradual release arrangement 321 may comprise a gate 325 and a gate bridge 327, constituting a barrier assembly.

The gate 325 is fitted within the opening 215 of the support assembly 205, between the vertical storage supports 211, and is configured to gradually slide along the vertical storage supports 211 upwardly and downwardly (as shown by an arrow 330 in FIG. 22) so as to increase a height h of a portion of the opening 215 exposing a corresponding portion of the opening 208 of the baggage storage compartment 204.

The gate bridge 327 comprises a proximal edge 329 which is attached to an upper edge of the gate 325 and configured to advance together therewith towards and from a top portion 212 of the baggage storage compartment 204 and a distal edge 331 which is intended to be disposed adjacent the baggage carousel 10 when the baggage is unloaded.

The gate bridge 327 forms an angle b (FIG. 23B) with the gate 325, which may optionally vary depending on the position of the gate 325.

The arrangement is such that when the trolley T is mounted over the mounting stage 213 and the baggage articles B loaded thereon are to be unloaded to the baggage carousel C, the lifting mechanism 217 is activated to rotate the support assembly 205 so as to increase the angle a. As the support assembly 205 rotates and the mounting stage 213 is lifted and tilted the gradual release arrangement 321 is activated such that the gate 325, which is normally is at a closed position in which it covers at least a majority of the opening 215 and prevents from any baggage to be released through the opening 208, gradually slides downwardly, along the direction shown by the arrow 330, enlarging thereby the opening 215 and gradually expose the opening 208 to allow the baggage articles B to be unloaded therefrom.

Due to the tilted position of the baggage storage compartment 204, caused by the tilted position of the mounting stage 213 on which it is mounted and gradual exposure of the opening 208, the baggage is released gradually due to a gravitational force in a baggage flow direction (shown by an arrow 229 in FIG. 20), which is substantially perpendicular to the direction 330 along which the gate 325 slides.

The proximal edge 329 of the gate bridge 327 slides downwardly together with the gate 325, allowing the baggage released from the exposed opening 208 to be poured on the gate bridge 327 and then gradually slide therealong towards the baggage carousel C.

According to a further example, for example as illustrated in FIG. 26, a baggage unloading device 401 may be provided comprising a pair of vertical holders 407, a trolley mounting stage 413 with a pair of vertical storage supports 411 projecting upwardly from the mounting stage and defining an opening 415 therebetween, and an unloading bridge 431 constituting a gradual release arrangement. The trolley mounting stage 413 (together with the vertical storage supports 411) and the unloading bridge 431 are each independently pivotably articulated to the vertical holders 407, i.e., each may be pivoted with respect to the vertical holders independently of the others.

The unloading bridge 431 comprises a conveyer assembly 433, which may be selectively driven, for example to move baggage articles B thereon. The conveyer assembly 433 may comprise a plurality of belts 435, which may each be provided to be driven independently of the others (for example at different speeds), or a single belt. The belts 435 may have a textured surface, e.g., to facilitate moving of baggage articles B thereupon.

In use, the trolley T is positioned such that the opening 208 of its baggage storage compartment 204 lies in registration with the opening 415 defined by the baggage unloading device 401. The trolley mounting stage 413 and unloading bridge 431 are pivoted together, for example at an angle of about 35-45°, so as to tip the trolley T forward. Subsequently, the unloading bridge 431 is further pivoted in the same direction, for example a further 45°, resulting in the baggage articles B within the storage compartment 204 to be released onto the unloading bridge 431. The conveyer assembly 433 is then driven to unload the baggage articles B from the unloading bridge 431. The rate at which baggage articles B are released may be controlled, inter alia, by regulating the angle at which the trolley mounting stage 413 is pivoted, as well as the speed of the belts 435.

According to any of the examples of baggage unloading devices herein the specification and claims, a sensor (not illustrated) may be provided to detect, e.g., the presence and/or speed of release of baggage articles B from the trolley T. Variables which affect the speed of release may be adjusted accordingly to achieve a desired speed of gradual release thereof.

In addition, after the baggage unloading device has completed a suitable process for emptying the trolley T, a trolley scanner (not illustrated, and which may be the same scanner described above to detect the presence and/or speed of release of baggage articles B from the trolley) may be used to detect the presence of any baggage article remaining within the trolley, and to notify an operator thereof.

It should be appreciated that the baggage unloading devices according to the presently disclosed subject matter allow a gradual gravitational release of the baggage minimizing the chances of damaging the baggage, without hazardous or man intervention.

Those skilled in the art to which this invention pertains will readily appreciate that numerous changes, variations, and modifications can be made without departing from the scope of the presently disclosed subject matter, mutatis mutandis.

The invention claimed is:

1. A baggage transfer conveyer unit for use with a baggage carousel having a carousel transferring path for transferring a baggage therealong, the baggage transfer conveyor unit configured for being mounted over the baggage carousel, the baggage transfer conveyor unit comprising:
   a proximal end, a distal end, and an upper surface by means of which the baggage is to be transferred from said proximal end to said distal end along a conveyor unit transferring path extending between said proximal and distal ends;
   a baggage transferring mechanism configured for causing said upper surface to transfer the baggage along said conveyor unit transferring path; and
   a baggage diverting mechanism configured for causing a part of said upper surface to divert the baggage from the conveyer unit transferring path along a diverted direction different from that of said conveyor unit transferring path;
   wherein the baggage transfer conveyer unit is configured to be mounted over said baggage carousel such that the conveyer unit transferring path is aligned with the carousel transferring path.

2. The baggage transfer conveyer unit according to claim 1, wherein said conveyor unit transferring path is configured for forming a continuous baggage transferring path with said carousel transferring path when the baggage transfer conveyor unit is mounted over said carousel and when the baggage diverting mechanism is not in operation.

3. The baggage transfer conveyer unit according to claim 1, wherein the upper surface of the baggage transfer conveyer unit comprises a top surface portion, a proximal surface portion extending between the proximal end of the conveyer unit and the top surface portion, and a distal surface portion extending between the top surface portion and the distal end of the baggage transfer conveyer unit and, optionally, wherein the upper surface has a convexly curved shape such that the proximal surface portion extends upwardly from the proximal end to the top surface portion and the distal surface portion extends downwardly from the top portion to the distal end.

4. The baggage transfer conveyer unit according to claim 1, further comprising:
   a lower surface extending between the proximal and distal ends of the baggage transfer conveyer unit so as to face the baggage carousel when the baggage transfer conveyer unit is mounted over the baggage carousel and
   two sides extending between the upper and lower surfaces and defining therewithin a body of the baggage transfer conveyer unit.

5. The baggage transfer conveyer unit according to claim 4, wherein said body when seen in the side view has a substantially trapezoid shape.

6. The baggage transfer conveyer unit according to claim 1, wherein said baggage carousel comprises a moveable carousel belt, wherein the baggage transfer conveyor unit is configured to be mounted over said belt slightly spaced upwardly therefrom, such that:
   continuous baggage flow is maintained along said carousel transferring path and said conveyer unit transferring path; and
   movement of the carousel belt under the baggage transfer conveyer unit is allowed.

7. The baggage transfer conveyer unit according to claim 1, further comprising a mounting arrangement for mounting thereover said baggage carousel.

8. The baggage transfer conveyer unit according to claim 1, wherein the baggage diverting mechanism is configured for changing the direction of the baggage with respect to the conveyer unit transferring path.

9. The baggage transfer conveyer unit according to claim 1, wherein the baggage diverting mechanism is configured for moving the baggage along said diverted direction.

10. The baggage transfer conveyer unit according to claim 1, wherein the diverted direction forms an angle with said conveyer unit transferring path.

11. The baggage transfer conveyer unit according to claim 1, further comprising a diverting surface from which the baggage is diverted by the baggage diverting mechanism.

12. The baggage transfer conveyer unit according to claim 1, wherein the baggage diverting mechanism has a diverting mode of operation and a transferring mode of operation, such that in the transferring mode the baggage diverting mechanism together with the baggage transferring mechanism cause the upper surface of the baggage transfer conveyer unit to transfer the baggage along said conveyor unit transferring path from the proximal end of the unit to the distal end of the unit, and in the diverting mode the baggage diverting mechanism causes a part of the upper surface of the baggage transfer conveyer unit to divert the baggage along said diverted direction.

13. The baggage transfer conveyer unit according to claim 1, wherein said part of the upper surface of the baggage transfer conveyer unit is constituted by a plurality of rollers each having a roller axis and being configured for rotating about said axis, said rollers being arranged such that their axes are parallel and such that they are all rotatable in the same direction, wherein the baggage diverting mechanism is configured for pivoting said rollers between a position in which their axes are perpendicular to the conveyor unit transferring path when the baggage diverting mechanism is in said transferring mode and a position, in which their axes are oriented differently than being perpendicular to the conveyor unit transferring path when the baggage diverting mechanism is in said diverting mode.

14. The baggage transfer conveyer unit according to claim 1, wherein the baggage diverting mechanism is configured to have an activated mode in which it causes a part of the upper surface of the conveyer unit to divert the baggage from the conveyor unit transferring path and an inactivated mode in which the baggage diverting mechanism is not in operation.

15. The baggage transfer conveyer unit according to claim 14, further comprising a belt crank assembly having a plurality of straps constituting said part of the upper surface and oriented such that their longitudinal direction is substantially perpendicular to the conveyor unit transferring path.

16. The baggage transfer conveyer unit according to claim 1, further comprising an activation means for activating the baggage diverting mechanism.

17. The baggage transfer conveyer unit according to claim 1, wherein the upper surface comprises one or more moving elements which are movable for advancing the baggage along the conveyor unit transferring path.

18. The baggage transfer conveyer unit according to claim 17, wherein the baggage transferring mechanism is configured for moving said one or more moving elements in a direction and at speed corresponding to those of the movement of the carousel along the carousel transferring path.

19. The baggage transfer conveyer unit according to claim 1, wherein the upper surface of the baggage transfer conveyer unit comprises a plurality of transferring rollers having parallel axes perpendicular to the conveyor unit transferring path and rotatable about these axes in the same direction.

20. The baggage transfer conveyer unit according to claim 19, wherein the transferring rollers constitute said proximal and distal surface portions of the conveyer unit and wherein the top portion is free of such transferring rollers.

21. The baggage transfer conveyer unit according to claim 1, wherein the proximal and distal surface portions of the upper surface are each constituted by a transferring belt.

22. A baggage sorting system for sorting a baggage disposed on a baggage carousel having a carousel transferring path for transferring the baggage therealong:
   a baggage identification unit configured for identifying the baggage based on an identifying data thereof;
   at one baggage transfer conveyor unit of claim 1; and
   a control unit configured for matching between the baggage and one of said at least one baggage transfer conveyors based on information received from said baggage identification unit and for activating the baggage diverting mechanism of said baggage transfer conveyor unit when the baggage reaches a predefined position on said one of said at least one baggage transfer conveyors.

* * * * *